(12) United States Patent
Amerga et al.

(10) Patent No.: US 6,819,931 B2
(45) Date of Patent: Nov. 16, 2004

(54) METHOD AND APPARATUS FOR ASSIGNING TRACKING ELEMENTS TO RECEIVED SIGNALS

(75) Inventors: Messay Amerga, San Diego, CA (US); Abhay A. Joshi, San Diego, CA (US); Mark Levin, Cardiff, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/904,325

(22) Filed: Jul. 12, 2001

(65) Prior Publication Data

US 2003/0013457 A1 Jan. 16, 2003

(51) Int. Cl.$^7$ .................................................. H04Q 7/20
(52) U.S. Cl. .................... 455/456.6; 455/506; 375/148; 375/349; 375/347
(58) Field of Search ............................. 455/456.6, 506, 455/132, 134; 375/148, 149, 349, 347, 130; 370/206, 335, 441, 342

(56) References Cited

U.S. PATENT DOCUMENTS

| 5,490,165 A | * | 2/1996 | Blakeney et al. ............ 370/335 |
| 6,072,807 A | * | 6/2000 | Daudelin ..................... 370/465 |
| 6,269,075 B1 | * | 7/2001 | Tran ............................ 370/206 |
| 6,408,039 B1 | * | 6/2002 | Ito ............................... 375/347 |
| 6,526,090 B1 | * | 2/2003 | Papasakellariou ........... 375/136 |

FOREIGN PATENT DOCUMENTS

| WO | 0120803 | 3/2001 | ........... H04B/1/707 |

* cited by examiner

*Primary Examiner*—William Trost
*Assistant Examiner*—Danh C Le
(74) *Attorney, Agent, or Firm*—Philip Wadsworth; Charles Brown; Donald Kordich

(57) ABSTRACT

A method for assigning tracking elements includes sorting a list of potential assignments according to a diversity criterion. In one example, a list of received signal instances is sorted first according to a measure of energy and then sorted again according to the diversity criterion. In a further embodiment, a demodulation element may be labeled available for assignment yet continue to output demodulated symbols in a locked state. Applications to a mobile station of a CDMA system for cellular telephony are discussed.

25 Claims, 25 Drawing Sheets

METHOD AND APPARATUS FOR ASSIGNING TRACKING ELEMENTS TO RECEIVED SIGNALS

BACKGROUND

I. Field of the Invention

The present invention relates to wireless communications, and particularly to signal reception.

II. Description of the Related Art

A wireless receiver may receive a signal that has traveled several distinct propagation paths as generated by the multipath characteristics of the transmission channel. One characteristic of a multipath channel is the time spread introduced in a signal that is transmitted through the channel. For example, if an ideal impulse is transmitted over a multipath channel, the received signal appears as a stream of pulses. Another characteristic of the multipath channel is that each path through the channel may cause a different attenuation factor. For example, if an ideal impulse is transmitted over a multipath channel, each pulse of the received stream of pulses generally has a different signal strength than other received pulses. Yet another characteristic of the multipath channel is that each path through the channel may cause a different phase on the signal. For example, if an ideal impulse is transmitted over a multipath channel, each pulse of the received stream of pulses generally has a different phase than other received pulses.

In a mobile radio channel of a system for cellular communications, the multipath may be created by the reflections of the signal from obstacles in the environment, such as buildings, trees, cars, and people. In general, the mobile radio channel is a time varying multipath channel due to the relative motion of the structures that create the multipath. For example, if an ideal impulse is transmitted over the time varying multipath channel, the received stream of pulses would change in time location, attenuation, and phase as a function of the time that the ideal impulse was transmitted.

The multipath characteristic of a channel can result in signal fading. Fading is the result of the phasing characteristics of the multipath channel. A fade occurs when multipath vectors are added destructively, yielding a received signal that is smaller than either individual vector. For example if a sine wave is transmitted through a multipath channel having two paths where the first path has an attenuation factor of X dB, a time delay of $\delta$ with a phase shift of $\theta$ radians, and the second path has an attenuation factor of X dB, a time delay of $\delta$ with a phase shift of $\theta+\pi$ radians, no signal would be received at the output of the channel.

In a code-division multiple-access (CDMA) cellular telephone system, a common frequency band is used, allowing for simultaneous communication between a mobile station (e.g. a cellular telephone, wireless local loop station, or wireless modem) and more than one base station. Signals occupying the common frequency band are discriminated at the receiving station through the spread spectrum CDMA waveform properties based on the use of a high-speed pseudonoise (PN) code. The PN code is used to modulate signals transmitted between the base stations and the mobile stations. Transmitter stations using different PN codes, or the same PN code offset in time, produce signals that may be distinguished at the receiving station. The PN modulation also allows the receiving station to receive a signal from a single transmitting station where the signal has traveled over several distinct propagation paths.

In narrow-band modulation systems such as the analog FM modulation employed by conventional radio telephone systems, the existence of multiple paths in the radio channel may result in severe multipath fading. In a wideband CDMA system, however, instances of a transmitted signal that are received over different paths may be discriminated in the demodulation process. This discrimination not only greatly reduces the severity of multipath fading but also provides an advantage to the CDMA system.

The deleterious effects of fading can be mitigated by controlling transmitter power in the CDMA system. A system for base station and mobile station power control is disclosed in U.S. Pat. No. 5,056,109 entitled "METHOD AND APPARATUS FOR CONTROLLING TRANSMISSION POWER IN A CDMA CELLULAR MOBILE TELEPHONE SYSTEM," issued Oct. 8, 1991, and assigned to the Assignee of the present invention. Furthermore the effect of multipath fading can be reduced through communication with multiple base stations using a soft handoff process. A handoff process is disclosed in U.S. Pat. No. 5,101,501 entitled "SOFT HANDOFF IN A CDMA CELLULAR TELEPHONE SYSTEM," issued Oct. 8, 1991, and assigned to the Assignee of the present invention.

The existence of multipath can provide path diversity to a wideband spread spectrum system. A spread spectrum system generates a spread information signal by modulating an information signal with a pseudonoise (PN) code. Generally the PN code runs at many times the rate of the information signal. The rate at which the PN code is generated is called the chip rate, and the duration of one data bit of the PN code is called the chip time. If two or more paths are available that have a differential path delay greater than one chip time, then two or more processing elements (called demodulation elements or fingers) may be employed to separately demodulate the signal instances received over those paths. Such signals typically exhibit independence in multipath fading—i.e., they do not usually fade together—so that loss of signal occurs only when all of the signal instances being demodulated experience a fade at the same time. Therefore, the output of the two or more demodulation elements can be combined to obtain path diversity. In an ideal system, both the base station and the mobile station employ multiple demodulation elements.

As a mobile station moves through the physical environment, the number and qualities of the signal paths may vary constantly, both as received at the mobile station and as received at the base station. Therefore, a receiver may use a special processing element (called a searcher element) that continually scans the channel in the time domain to determine the existence, time offset, and the signal strength of signals in the multiple path environment. The output of the searcher element provides information that may be used to ensure that the demodulation elements are tracking the most advantageous paths.

In an exemplary CDMA cellular telephone system, each base station transmits a pilot signal that is used by the mobile stations to obtain initial system synchronization and to provide robust time, frequency, and phase tracking of the base station transmitted signals. The pilot signals transmitted by the various base stations in a system may all use the same PN code, with each base station's signal being spread using a different code phase offset (i.e. the PN codes transmitted by neighboring base stations are identical but skewed in time with respect to one another). This code phase offset allows the pilot signals to be distinguished from one another according to the base station from which they originate. A typical base station configuration may also contain multiple sectors, with each sector comprising independent transmit and receive antennas and having its own PN code or code offset. While the mobile station is in the call inactive mode, its searcher element may continue to scan the received signal at the code offsets corresponding to the transmitted pilot signals of nearby base stations. When a call is initiated, a PN code address is determined for use during this call. The code address may be either assigned by the base station or determined by prearrangement based upon the identity of the mobile station. After a call is initiated, the mobile station's searcher element continues to scan the pilot signals transmitted by neighboring base stations, and a mobile station may communicate with several base stations at once.

Diversity combining in the mobile station significantly advances the quality and reliability of communications in a cellular telephone system. Diversity exploits the random nature of radio propagation by finding independent (or at least highly uncorrelated) signal paths for communication. If one radio path undergoes a deep fade, the receiver attains another independent path having a stronger signal. By having more than one path to select from, the signal-to-noise ratio at the receiver may be improved. A form of maximal ratio combining may be used to increase the benefit in which the signal-to-noise ratio is determined for each path. Each path may then be combined with the contributions from the other paths weighted according to the signal-to-noise ratio. Combining may be coherent because pilot signal demodulation allows the phase of each path to be determined.

A description of a three-step method for assigning multiple demodulation elements in a mobile station of a spread spectrum system follows. This description may also be found in U.S. Pat. No. 5,490,165 ("the '165 patent"), issued Feb. 6, 1996, and assigned to the assignee of the present invention. In the first step, a searcher element within the mobile station performs a survey in which it scans a window of time offsets around a nominal arrival time of each signal of each base station with which active communication has been established. Each survey yields a list of survey paths that comprises pilot signal strengths, time offsets, and a corresponding base station pilot offset. The searcher element passes the information to a controller, which attempts to match the time offset of each survey path to the time offset of the paths currently being demodulated by the demodulation elements. If multiple demodulation paths match one survey path, then only the demodulation element having the strongest signal strength indication remains assigned to that path, and the other elements assigned to the survey path are labeled "free." If a path currently being demodulated does not correspond to any survey path, then a survey path entry based on the demodulation path information is added to the list of survey paths.

In the second step, the controller considers the survey paths in decreasing order of signal strength (i.e. with the survey path having the strongest signal strength being considered first). If, for the survey path under consideration, no demodulation element is assigned to any path in the corresponding sector, the controller attempts to assign a demodulation element to the survey path according to the following procedure. If any demodulation elements are currently unassigned or labeled "free," one of these demodulation elements is assigned to the survey path. If no such demodulation element is found, the demodulation element having the weakest path that is not the only demodulation path from its base station sector is re-assigned to the survey path. If no such demodulation element is found, a demodulation element assigned to the weakest path is re-assigned to the survey path if the survey path's signal strength is at least 3 dB stronger than the signal strength of the weakest demodulation path. This process continues until a re-assignment occurs or until the entire survey path list is traversed with no reassignments.

In the third step, if no reassignments have occurred in the second step, then the controller considers the survey paths again in order of decreasing signal strength. If no demodulation element is assigned to the survey path, the controller may assign an unassigned or free demodulation element to the path. If no such demodulation element is found, the controller may re-assign a demodulation element that is assigned to the same base station sector as the survey path if the survey path is more than 3 dB stronger than the current demodulation path. Alternatively, the controller may re-assign the weakest demodulation element that is assigned to any base station sector having two or more assigned demodulation elements if the survey path is more than 3 dB stronger than the demodulation path. Once a re-assignment occurs or the procedure fails an attempt to reassign a demodulation element to the survey path under consideration, the method begins again.

A method of reassignment as described above may require two traversals through the path list to obtain a desired level of diversity. It is desirable to obtain a reassignment of tracking elements (e.g. demodulation elements) that achieves a desired level of diversity but does not require two traversals of the path list. For example, it may be desirable to obtain a reassignment of tracking elements that achieves a desired level of path diversity, as well as a desired level of sector or cell diversity, but does not require two traversals of the path list.

SUMMARY

Embodiments of the present invention provide a method of assigning tracking elements including sorting a list of potential assignments (e.g. signal instances within a received signal) according to a diversity criterion. In certain embodiments, a list of signal instances is sorted first according to a measure of energy, then again according to a diversity criterion such as a predetermined level of cell diversity. In such embodiments, an order of at least a portion of the sorted list may be biased in favor of the diversity criterion. For example, the list may be sorted such that each of the first n potential assignments on the list corresponds to a different source. An aspect of additional embodiments of the invention is that a tracking element that outputs demodulated symbols when in a locked state may be labeled as available for assignment when in the locked state.

Other embodiments of the present invention provide a tracking stage of a mobile station that includes a searcher element, a set of tracking elements, and a controller. The controller sorts a list of potential assignments, as collected (at least initially) by the searcher element, according to a diversity criterion and modifies a current assignment of at least one of the tracking elements according to the sorted list.

Other embodiments of the present invention provide a data storage medium (e.g. a magnetic or optical disk or other recording, impression, or fixation; a semiconductor or ferromagnetic device such as a memory or integrated circuit; a printed code listing) having machine-readable code including instructions executable by an array of logic elements, where the instructions provide a method of assigning tracking elements including sorting a list of potential assignments according to a diversity criterion.

DETAILED DESCRIPTION

Throughout the disclosure, the terms 'demodulation element' and 'finger' are used interchangeably as particular examples of a tracking element. Additionally, the word "exemplary" is used exclusively herein to mean "serving as an example, instance, or illustration," and any embodiment described herein as being "exemplary" is not necessarily to be construed as preferred or advantageous over other embodiments.

Mobile station power control is important to the overall performance of a CDMA system. A base station within such a system transmits an independent power control command to each mobile station with which it communicates. In order to obtain the maximum possible system capacity, each mobile station must reduce its transmit power if any base station commands it to do so, even if other base stations instruct it to increase its transmit power. Therefore, it is desirable for the mobile station to communicate with several base stations (i.e. to communicate with at least a minimum level of cell diversity) so that it may receive power control commands from several sources.

Figure 1:
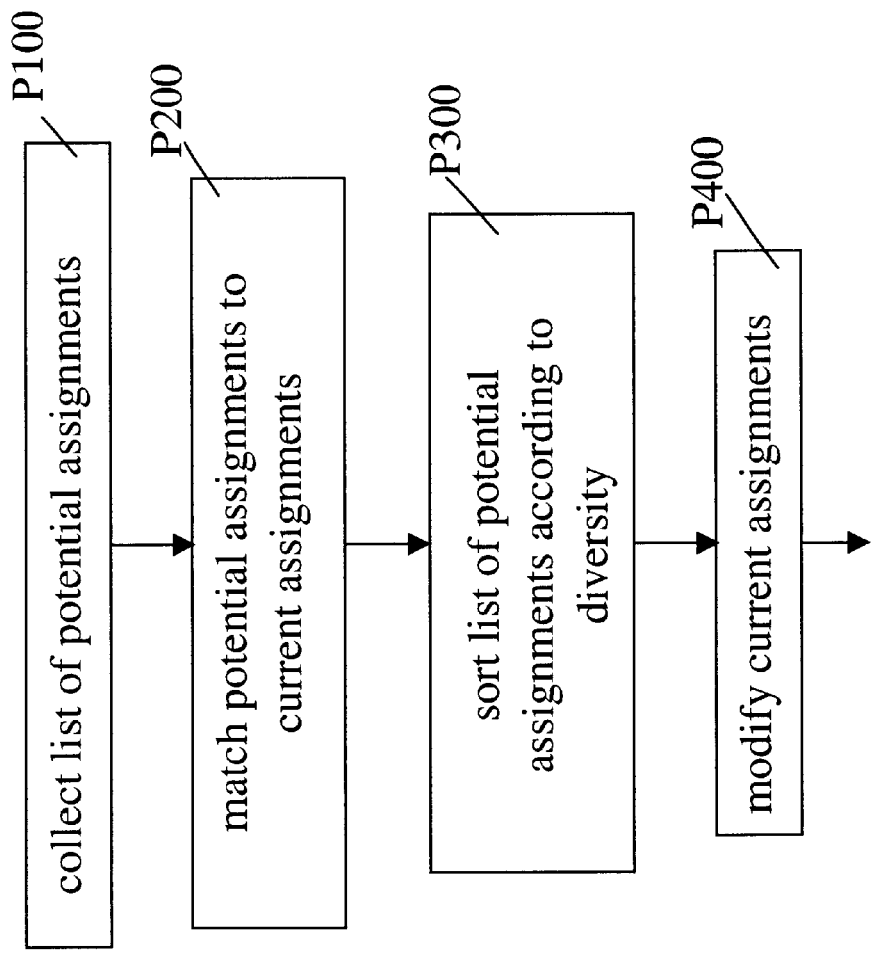
FIG. 1 is a flowchart of a method according to an embodiment of the invention.

FIG. 1 shows a flowchart of a method for assigning tracking elements according to an embodiment of the invention. Collection task P100 collects a list of potential assignments. For example, task P100 may collect a survey path list, each list entry including a time offset and a corresponding measure of signal strength for a signal instance received over that path. This list may include instances of signals transmitted by several sectors of one base station and/or by several different base stations (or 'cells'), and each list entry may also indicate which sector and/or cell transmitted the corresponding signal.

Figure 2:
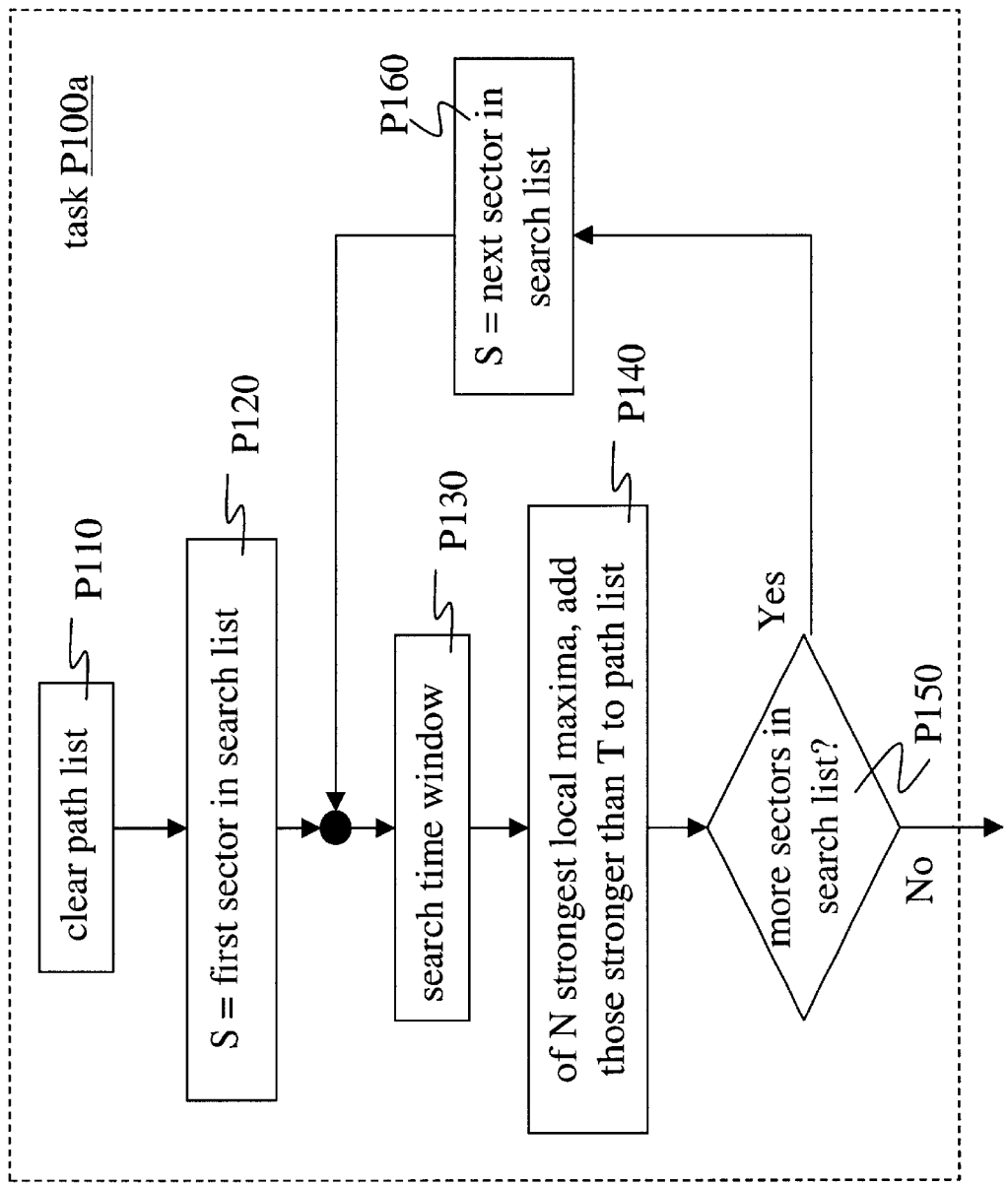
FIG. 2 is a flowchart of an implementation P100a of task P100.

FIG. 2 shows a flowchart of an exemplary implementation P100a of task P100. Reset subtask P110 clears the survey path list (e.g. discarding a list of paths found during a previous execution of task P100a). Initialization subtask P120 sets the current search sector S to be the first base station sector on a search list. In exemplary implementations, the search list may be an Active Set, a Candidate Set, or a Neighbor Set of a mobile station [such sets being defined in Section 1 of the specification of the IS-95B CDMA standard for cellular telephony, as published by Telecommunications Industry Association (TIA), Arlington, Va.]. In another implementation, task P100a may proceed on a cell-by-cell basis rather than sector-by-sector.

Search subtask P130 searches a time window for instances of a signal transmitted from sector S and identifies the N strongest local maxima. The time window may be selected in relation to an expected time of arrival of a signal transmitted from sector S; this time of arrival may be indicated by a signal received from another base station or sector and/or by signal instances received from sector S in recent cycles. In an exemplary implementation, the parameter N has a value of three, although any other integer value may be selected based on such implementational details as the amount of storage available for the path list, the number of searcher and/or tracking elements present, and the time allotted.

In one application, search subtask P130 searches within a received signal that is sampled at chip×2 (i.e. a string of received samples that are spaced 0.5 chips apart in time). If a smaller sample resolution is used, a single received signal instance may create more than one distinct peak. In such a system, subtask P130 may combine the distinct peaks (e.g. using weighted averaging) into a single local maximum.

Selection subtask P140 adds the information of each of the N maxima that exceed a minimum signal level threshold T to the list of survey paths. If more sectors remain in the search list, test subtask P150 directs the method to loop subtask P160, which selects the next sector under consideration and returns control to search subtask P130. If no more sectors remain in the search list, task P100a is complete.

Figure 3:
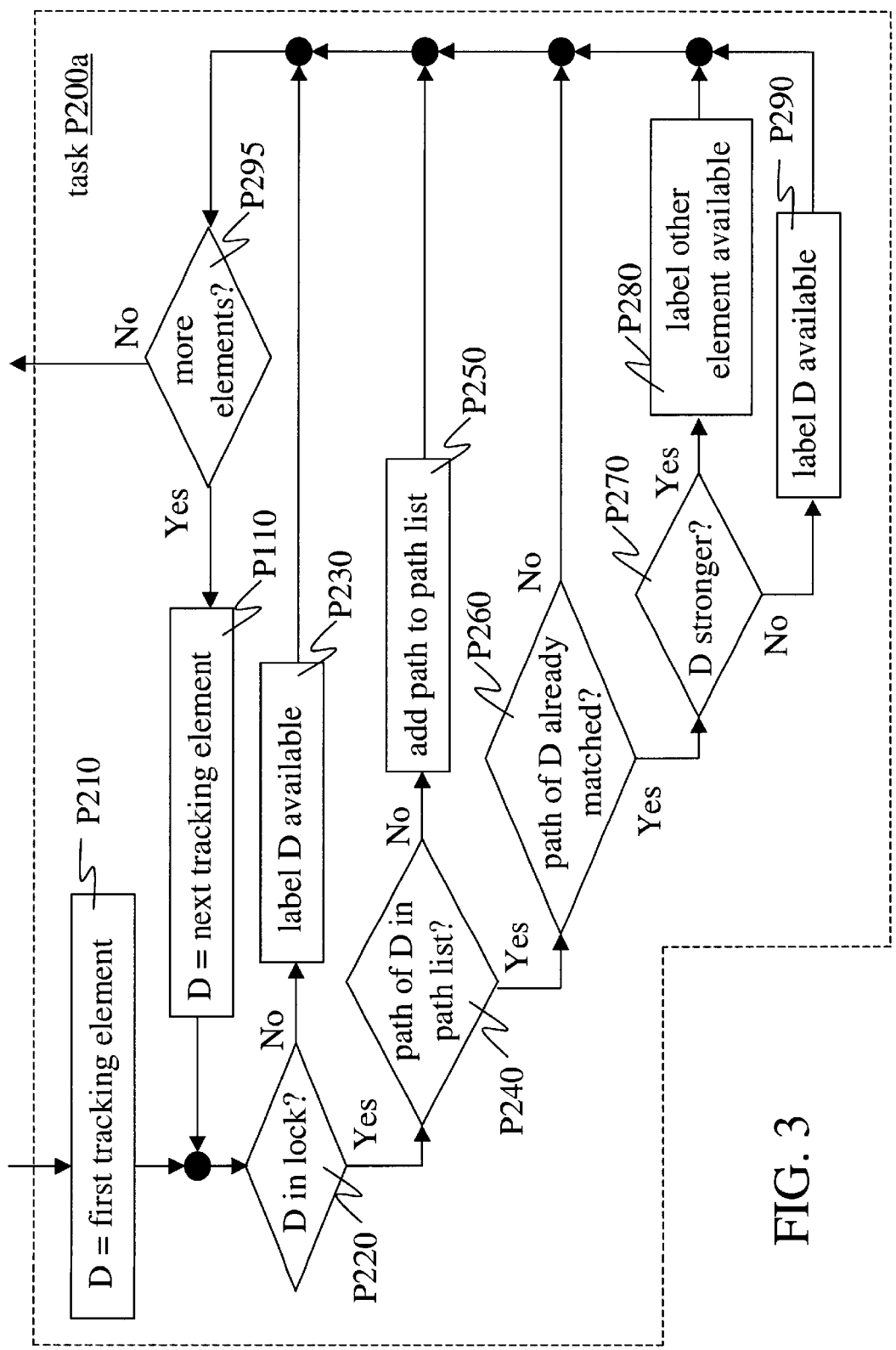
FIG. 3 is a flowchart of an implementation P200a of task P200.

Task P200 matches at least some of the potential assignments to current assignments of a set of tracking elements. FIG. 3 shows a flowchart of an exemplary implementation P200a of task P200. Initialization subtask P210 sets the current tracking element D to be the first of a set of tracking elements. Test subtask P220 checks the lock status of tracking element D. If tracking element D is not locked, de-assigning subtask P230 labels it as available for assignment.

If tracking element D is currently locked, test subtask P240 determines whether the path being tracked by element D is on the survey path list collected in task P100a. For example, subtask P240 may attempt to match the time offset and/or the transmitting sector or cell of the path to one of the entries in the list of survey paths.

Although each tracking path should correspond to at least one survey path, on occasion a searcher element may miss a path being tracked such that this path does not appear in the survey path list. In task P200a, it is assumed that a tracking element more accurately estimates the signal level and time offset of a path than the searcher element. Therefore, if subtask P240 determines that the survey path list contains no entry corresponding to the path being tracked by element D, collecting subtask P250 adds an entry corresponding to the path to the survey path list.

If a survey path that corresponds to the path being tracked by element D already exists, subtask P260 determines whether any other tracking element that has already been considered is also tracking this path. If so, then two tracking elements are tracking substantially the same path. Such a scenario may occur as two paths merge over time into one path or otherwise become indistinguishable. In this case, subtask P270 determines which element is tracking the stronger signal, and de-assigning subtasks P280 and P290 label the other element as available for assignment. If loop subtask P295 determines that more tracking elements remain, subtask P110 sets the current tracking element D to be the next tracking element and task P200a continues at subtask P220. Otherwise, task P200a is complete.

Figure 4A:
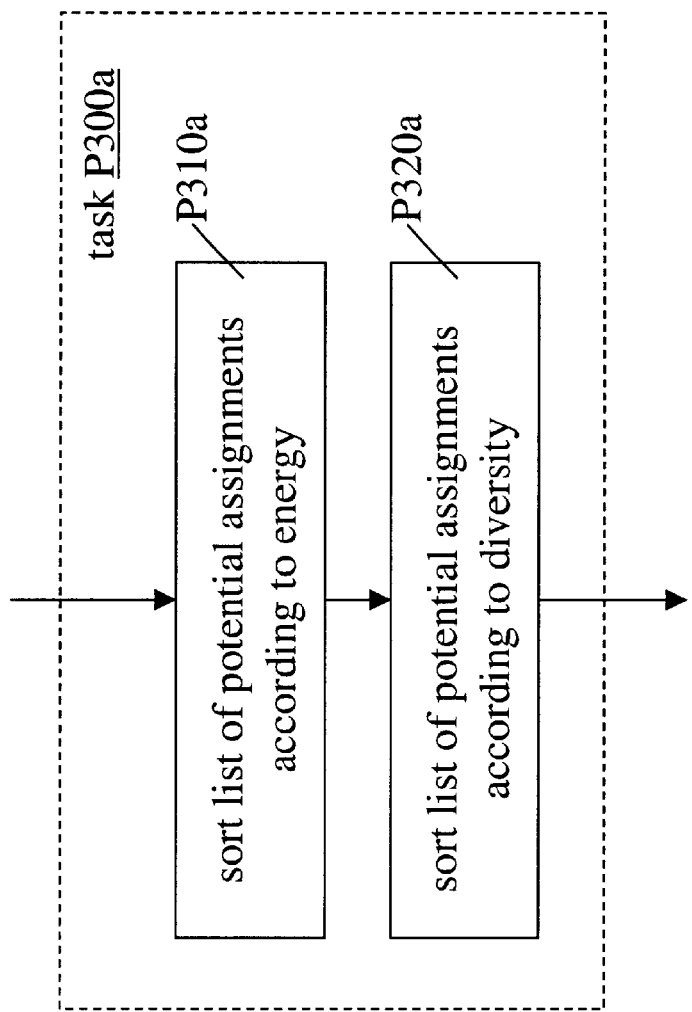
FIG. 4A is a flowchart of an implementation P300a of task P300.

Sorting task P300 sorts the list of potential assignments according to a diversity criterion. FIG. 4A shows an exemplary implementation P300a of sorting task P300. Subtask P310a sorts the list of potential assignments according to a measure of energy. Such an operation may be performed using any sorting algorithm appropriate to the data set and implementation (e.g. bubble sort, heap sort, quicksort). Subtask P320a then sorts the list of potential assignments according to a diversity criterion. In other implementations, subtasks P310a and P320a may be performed in the reverse order, in an overlapping or simultaneous fashion, or as a single task.

Figure 4B:
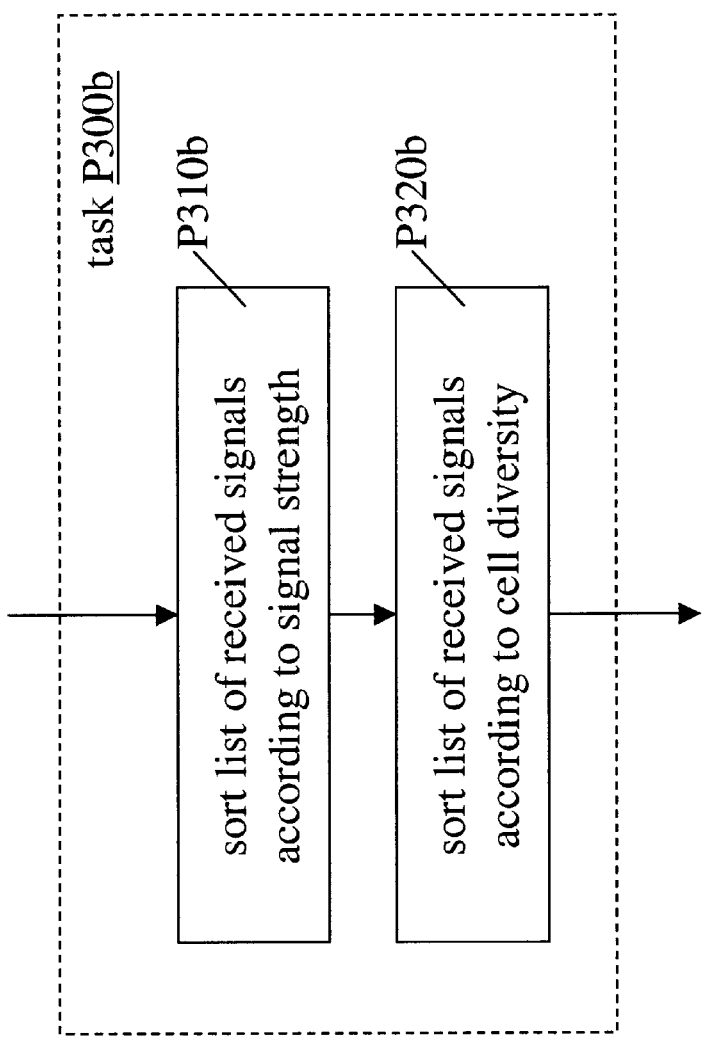
FIG. 4B is a flowchart of an implementation P300b of task P300.

FIG. 4B shows another exemplary implementation P300b of sorting task P300. Subtask P310b sorts a list of received signal instances according to a measure of signal strength. For example, subtask P310b may sort the received signals according to energy. For a signal received as a complex vector, the signal energy may be expressed as a magnitude of the complex vector (possibly averaged over a predetermined interval such as a specified number of chips or samples). Subtask P320b then sorts the list of received signal instances according to a criterion of cell diversity. In another implementation, subtask P320b may sort the list of received signal instances according to a criterion of an additional (or alternative) form of diversity, such as sector diversity. In yet other implementations, subtasks P310b and P320b may be performed in the reverse order, in an overlapping or simultaneous fashion, or as a single task.

Figure 5A:
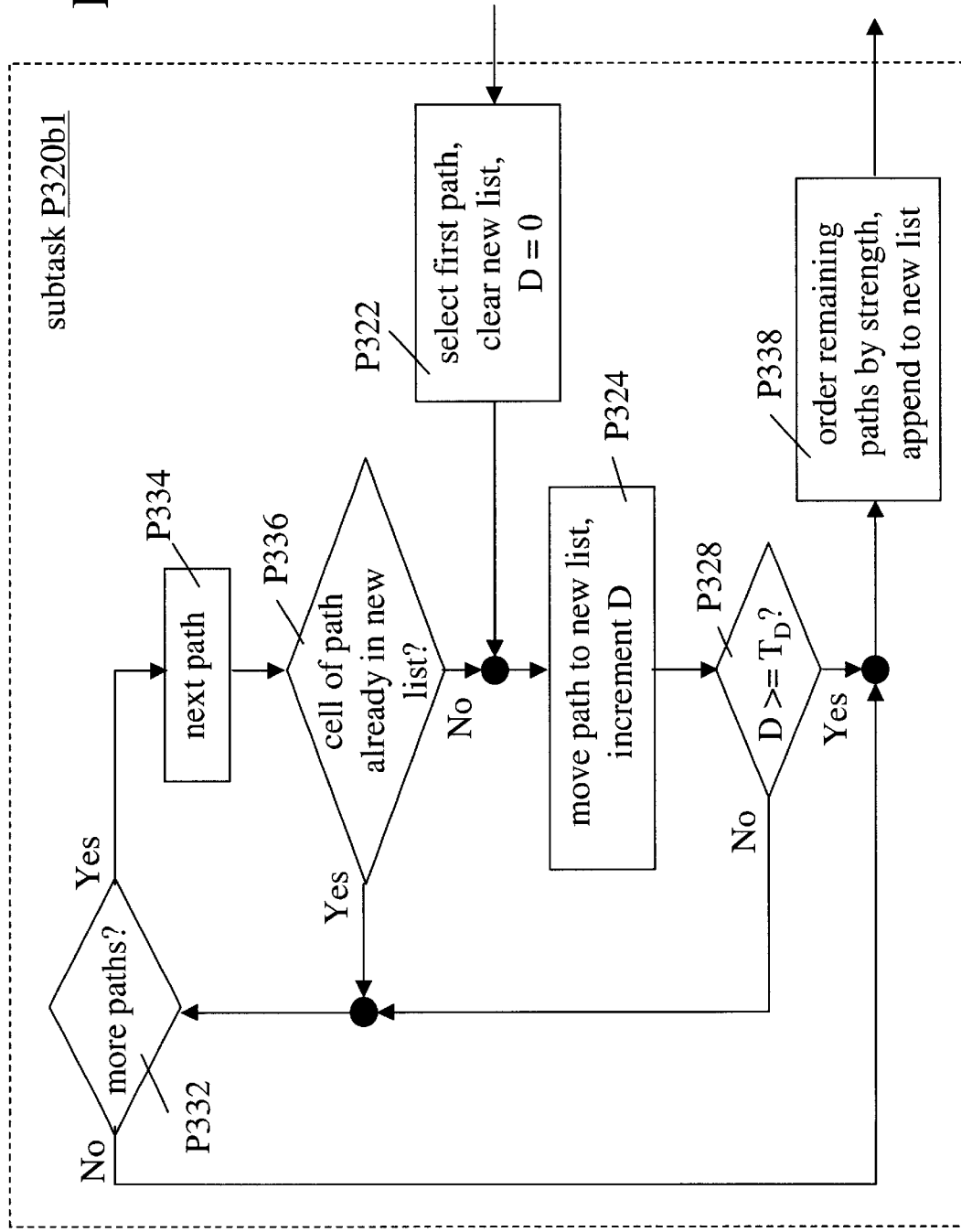
FIG. 5A is a flowchart of an implementation P320b1 of subtask P320b.

FIG. 5A shows an exemplary implementation P320b1 of subtask P320b in a case where the received signal instances correspond to different paths of one or more transmitted signals. In this implementation, a new list is ordered with a bias in favor of uncovered cells (i.e. cells not yet represented on a new list) until a predetermined diversity threshold is satisfied. Task P322 sets the current path to be the first path of a list of received signal instances already sorted according to a measure of signal strength. Task P322 may also clear a new list and initialize a cell diversity counter D. Task P324 moves (e.g. copies) the current path to the first entry of the new list and increments the cell diversity counter D.

Task P328 compares the value of the cell diversity counter D to a predetermined diversity threshold $T_D$. In an exemplary implementation, $T_D$ may have a value of three. If the threshold is not yet reached, then task P332 determines whether the sorted list contains any more paths. If more paths remain, task P334 selects the next path in the sorted list. Task P336 determines whether the transmitting cell that corresponds to the path is already represented by another path in the new list. If the cell is already represented, then tasks P332 and P334 select the next path. Otherwise, task P324 moves the path to the new list.

If no more paths remain, or if task P328 determines that the diversity threshold is met or exceeded, task P338 appends the paths remaining on the sorted list (already sorted as to energy) to the new list. The resulting new list is sorted according to both signal strength and cell diversity. Sorting according to a different cell diversity criterion, or according to a criterion of a different diversity (e.g. sector diversity), may be accomplished by changing task P336 to determine whether the current path or signal is diverse in another sense to the paths on the new list and possibly changing the diversity threshold $T_D$ as may be suitable.

Figure 5B:
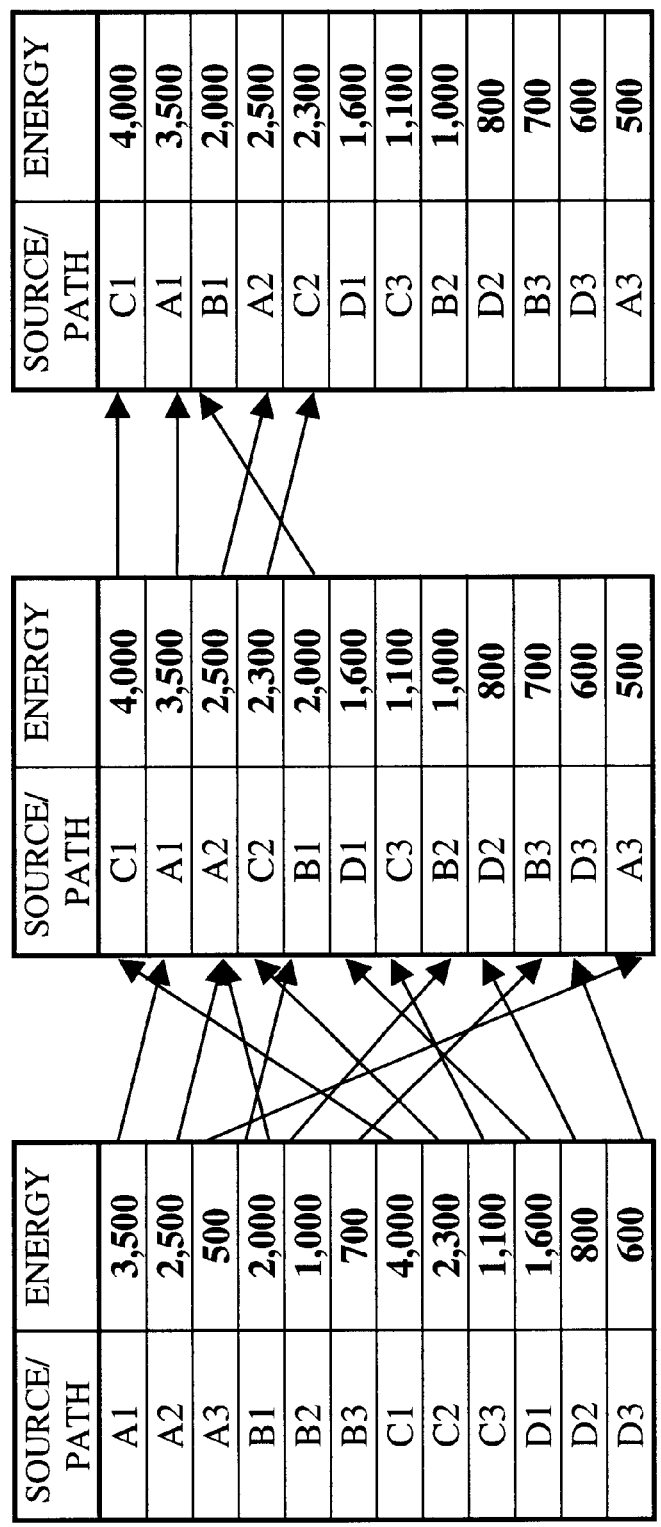
FIG. 5B illustrates a progression of a sorting operation as may be performed by subtask P320b1.

FIG. 5B illustrates a progression of a sorting operation as may be performed by subtask P320b1. Table A shows a list of received signal instances identified by source (e.g. cell or sector) A, B, or C, path number, and energy. Table B shows the same list after sorting by energy, and Table C shows the list after sorting by energy and diversity. In this example, the list is diversity-sorted so that the first three entries correspond to three different sources.

Figure 6A:
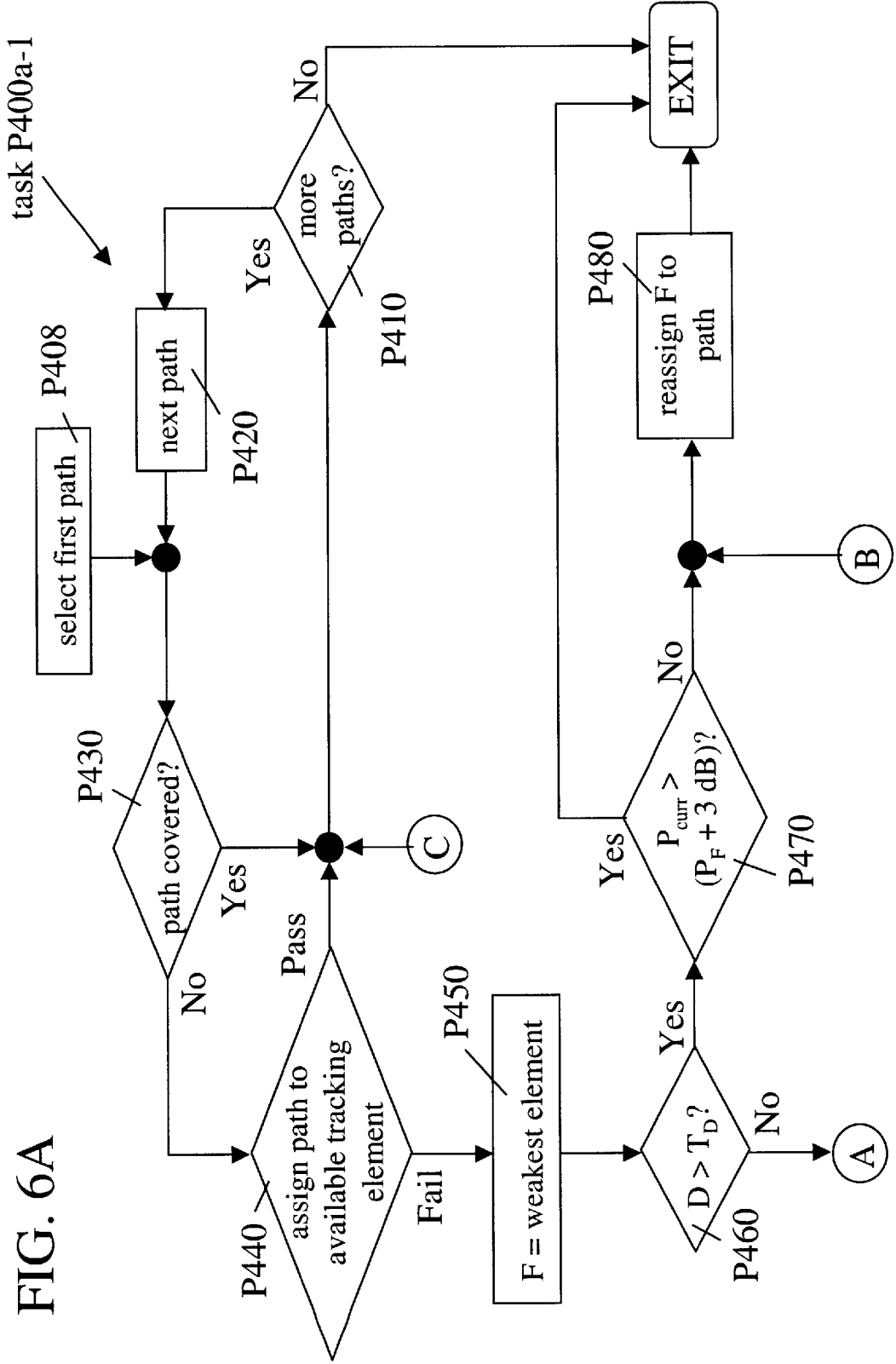
FIGS. 6A and 6B show a flowchart of an embodiment P400a of task P400.
Figure 6B:
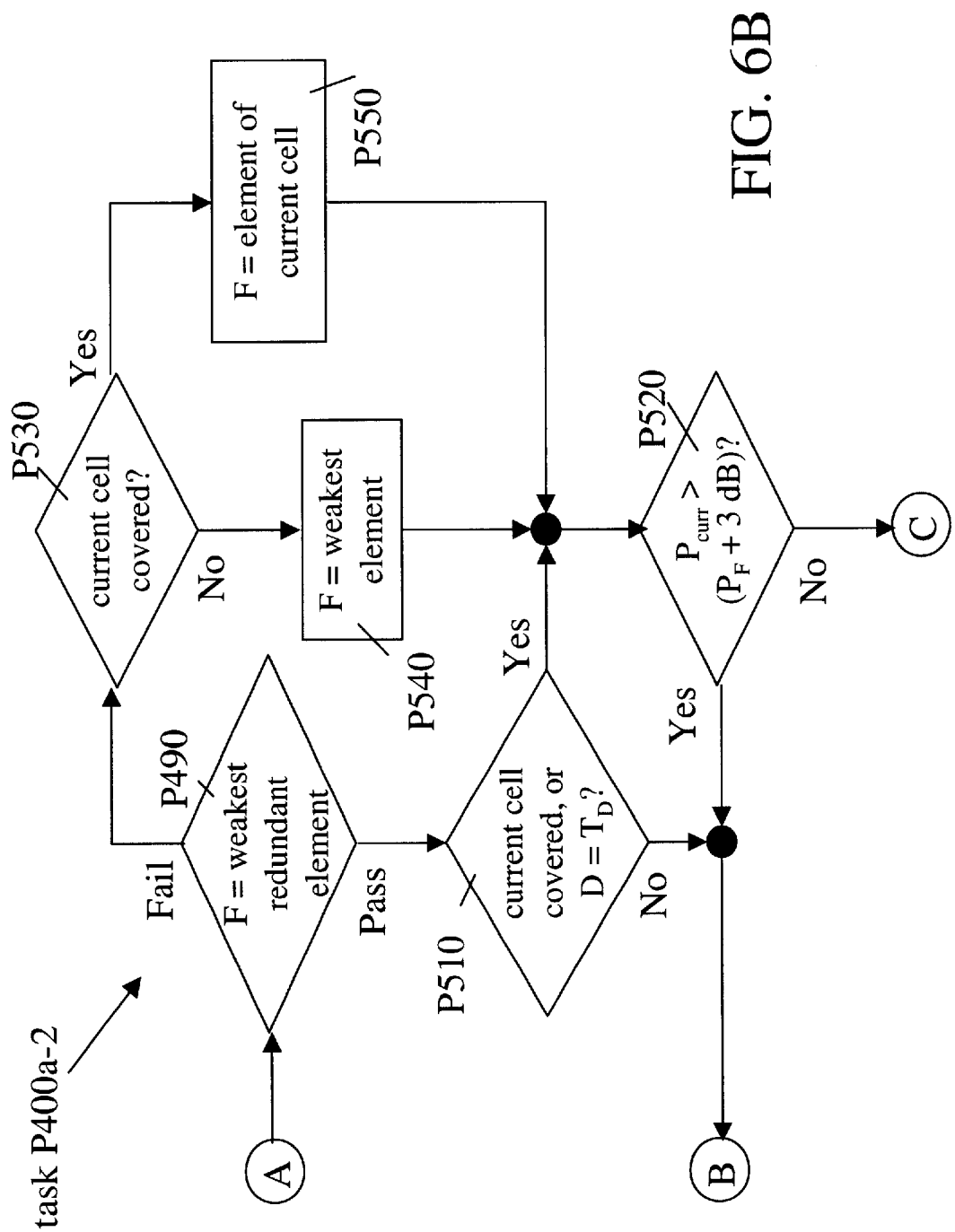

Task P400 modifies one or more current assignments of the tracking elements according to the sorted list of potential assignments. FIGS. 6A and 6B show a flowchart for an implementation P400a of task P400 in a case where the potential assignments correspond to instances of one or more transmitted signals received over different paths. Subtask P408 selects the first path of the incoming list (sorted by signal strength and diversity, e.g. as described above). Subtask P430 determines whether any tracking element is assigned to the selected path. If no element is assigned to the path and a tracking element is labeled available, subtask P440 assigns the path to the available element, subtask P410 determines whether any more paths remain, and subtask P420 selects the next path. If no such element is available, subtask P450 sets the current element F to be the tracking element that is assigned to the weakest path.

Subtask P460 determines whether the current measure of diversity D exceeds the predetermined diversity threshold $T_D$. (Note that the values and/or measures of diversity used in task P400 may be the same as or may differ from those used in subtask P320.) If the threshold is exceeded, subtask P470 determines whether the strength of the current path is sufficiently greater than the strength of the path assigned to element F to warrant reassignment. In this particular example, subtask P470 determines whether the power of the current path is more than twice as large as the power of the path assigned to element F.

Although subtask P470 may be implemented to perform a simple comparison, such a setting may result in thrashing (i.e. excessive reassignment activity) between two paths of similar signal strength. In another implementation, the relation tested in subtask P470 may be dynamic, based upon factors such as recent reassignment activity. If subtask P470 determines that the current path is not sufficiently strong, then no further reassignment will occur and task P400 terminates. Otherwise, subtask P480 reassigns the tracking element F to the current path and task P400a terminates.

Figure 7:
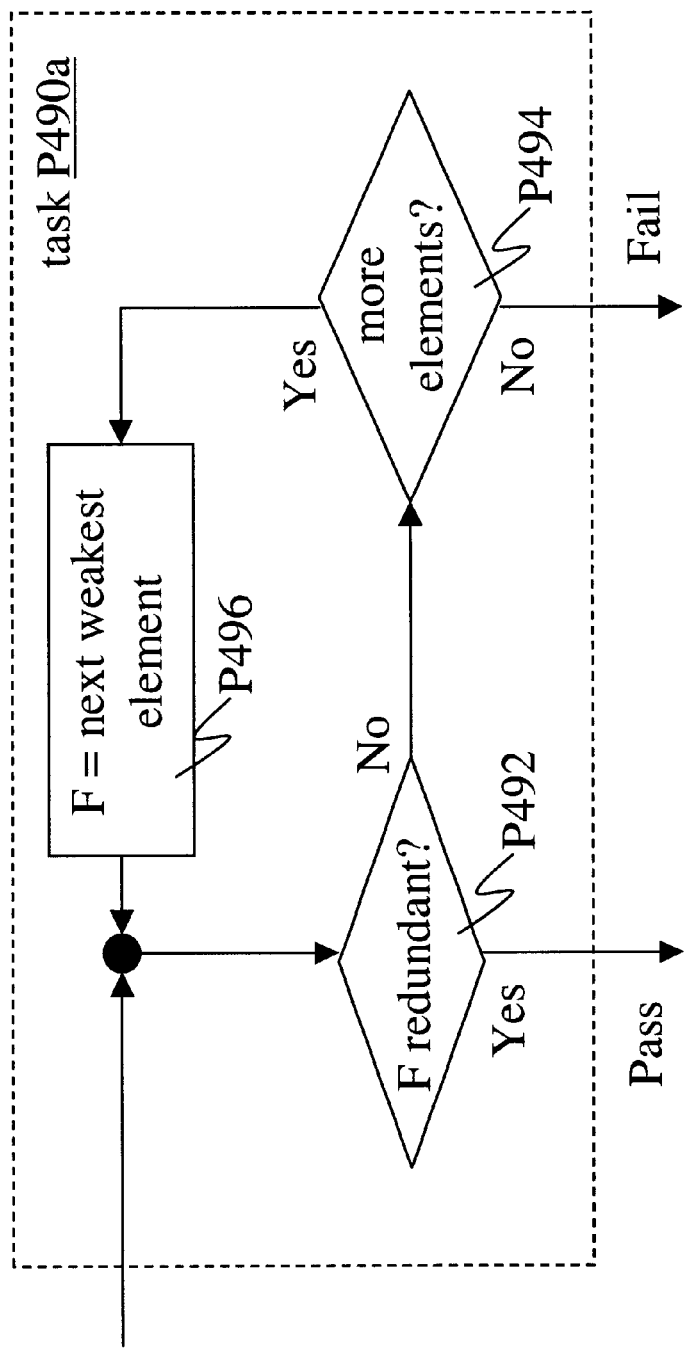
FIG. 7 is a flowchart of an implementation P490a of subtask P490.

If the current measure of diversity D does not exceed the predetermined diversity threshold $T_D$, subtask P490 (FIG. 6B) sets the current element F to be the tracking element that is assigned to the weakest path from a cell that is covered by more than one tracking element. In other words, subtask P490 selects the weakest redundant element F. FIG. 7 shows a flowchart for an exemplary implementation P490a of subtask P490. Task 492 determines whether the tracking element F is redundant (i.e. whether the path it tracks is transmitted by a cell covered by another tracking element). If not, and subtask P494 indicates that more tracking elements remain, subtask P496 sets the current element F to be the next weakest tracking element. Subtask P490a completes when a redundant element is found (Pass) or no elements remain (Fail).

If a redundant tracking element is found, subtask P510 determines whether at least one of the following two conditions is true: (1) the cell corresponding to the current path is already covered by a tracking element, or (2) the diversity threshold $T_D$ is met. If neither condition is true, then reassignment of element F will provide a diversity gain, and subtask P480 reassigns element F to the current path. If either of the conditions is true, subtask P520 determines whether the strength of the current path is sufficiently greater than the strength of the path assigned to element F to warrant reassignment. As described above with respect to subtask P470, the relation tested in subtask P520 may be adjusted (possibly dynamically) to achieve a desired tradeoff between signal power gain and excessive reassignment activity. If the test of subtask P520 fails, subtask P410 determines whether more paths remain.

If subtask P490 fails to identify any redundant tracking element, subtask P530 determines whether the cell corresponding to the current path is already covered by a tracking element. If the cell is covered, subtask P550 sets the current element F to be the tracking element covering the current cell. If the cell is not covered, subtask P540 sets the current element F to be the tracking element assigned to the weakest path. In both cases, subtask P520 determines whether the strength of the current path is sufficiently greater than the strength of the path assigned to element F to warrant reassignment. In another implementation, subtask P520 may be divided into two or more subtasks, each applying a different relation and receiving control from one or more among subtasks P510, P540, and P550.

Although reassignment may increase signal-to-noise ratio by moving tracking elements to stronger assignments, it is possible for the costs of reassignment to rival the benefits. Each time that a tracking element is assigned to a new signal instance, some time may be required to flush out the old data and lock onto the new instance. For a finite time, therefore, the reassigned element produces no valid output data. The time required to effect the reassignment may be increased for tracking elements that also perform demodulation (e.g. as described herein). If the reassigned element is the only one tracking the transmitted signal, a discontinuity in reception may result. Additionally, if the number of reassignments is not limited, the mobile station may react excessively to transient conditions, reassigning too many elements and possibly losing all contact with the network. Subtask P490a limits the number of reassignments to one per survey.

Figure 8A:
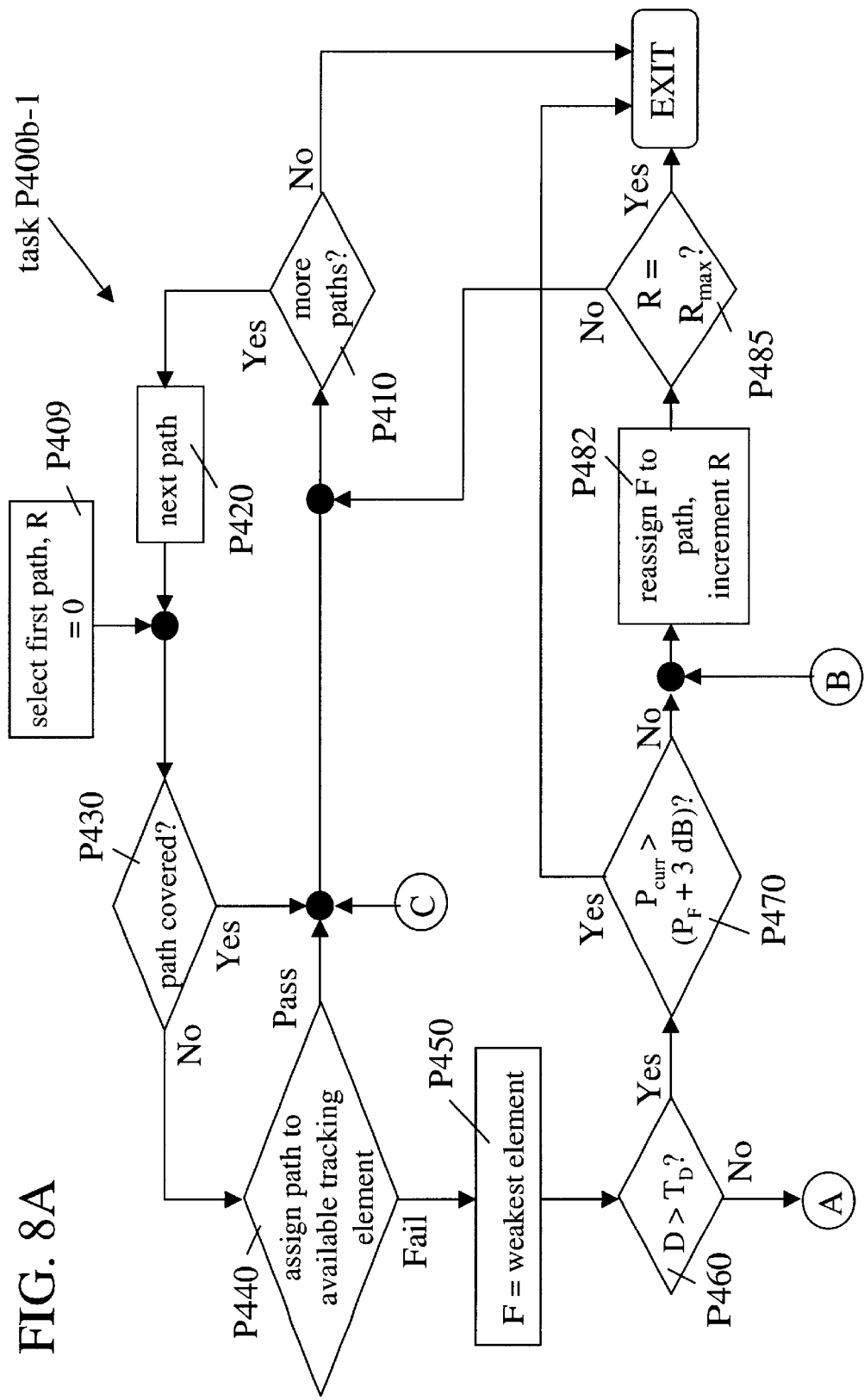
FIGS. 8A and 8B show a flowchart of an embodiment P400b of task P400.
Figure 8B:
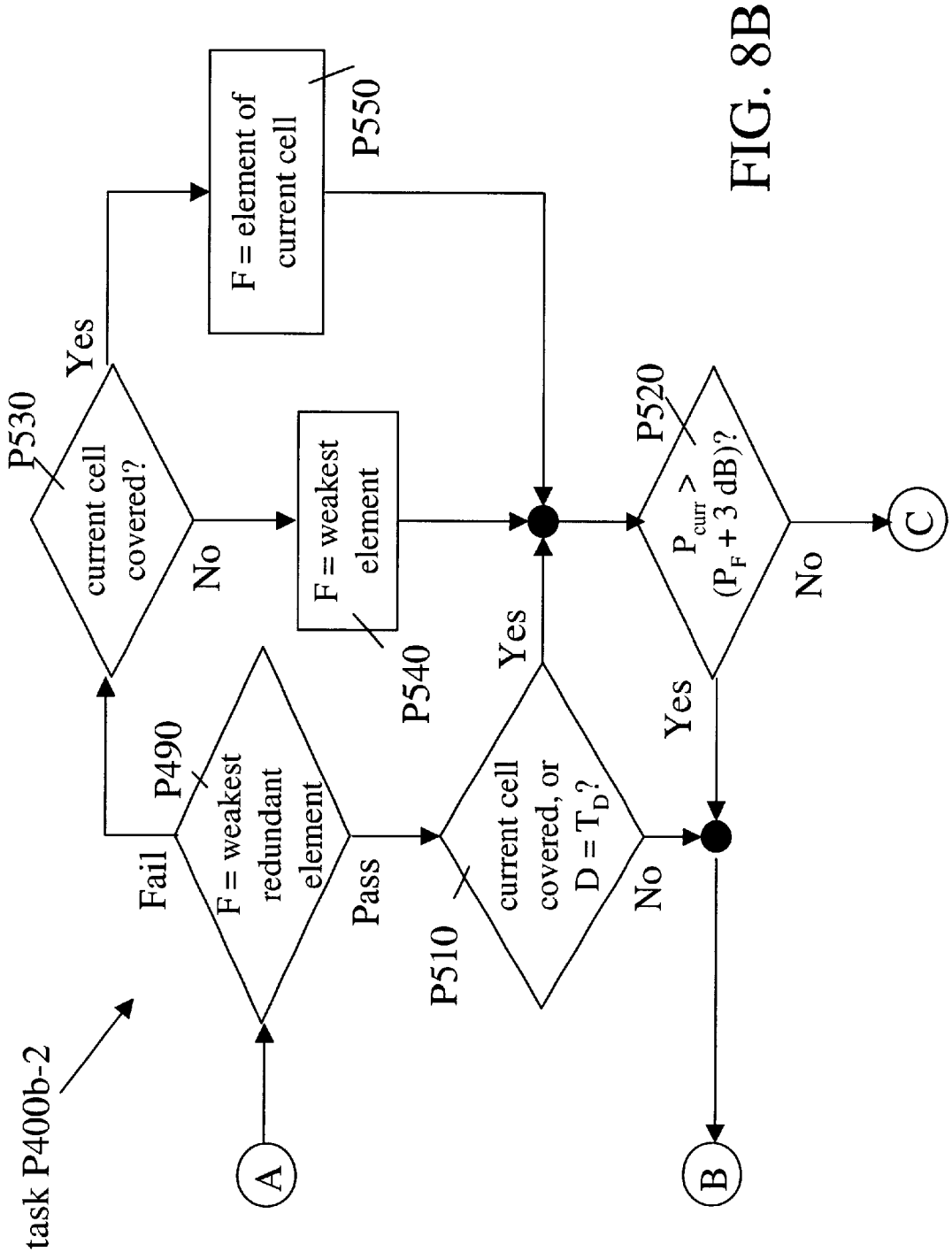

FIGS. 8A and 8B show a flowchart for another implementation P400b of task P400 that permits more than one reassignment per survey. In this case, subtask P409 selects the first path of the incoming list (sorted by signal strength and diversity, e.g. as described above) and also initializes a reassignment counter R (e.g. to zero). In addition to reassigning the current element F to the current path, subtask P482 also increments the reassignment counter R. If test subtask P485 determines that a reassignment threshold Rmax has been reached, task P400b is complete.

Figure 9:
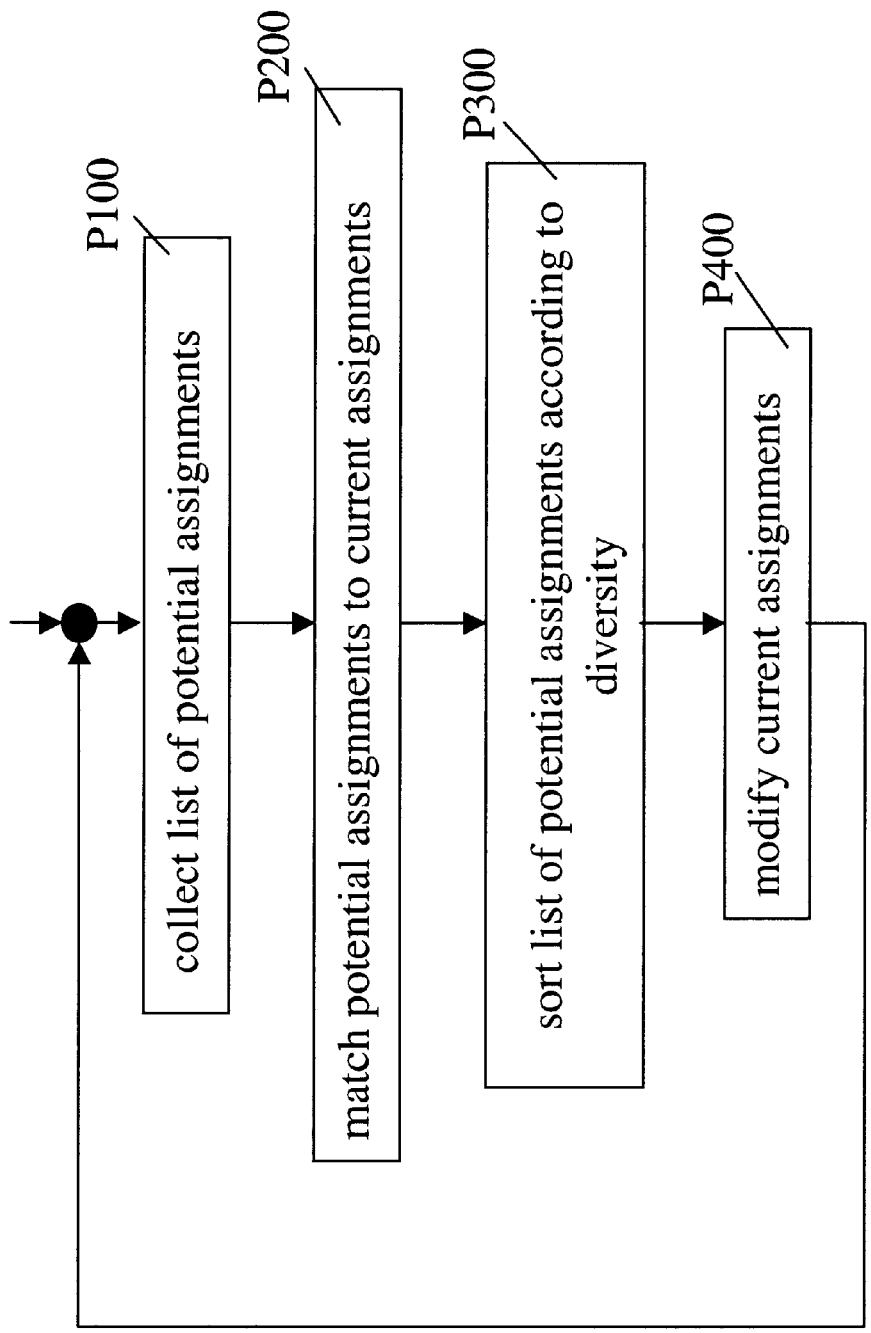
FIG. 9 is a flowchart of a method according to an embodiment of the invention.

FIG. 9 shows a flowchart of a method for assigning tracking elements according to another embodiment of the invention. Upon completion of task P400, the method resumes execution of task P100, continuing on a cyclical basis.

Figure 10:
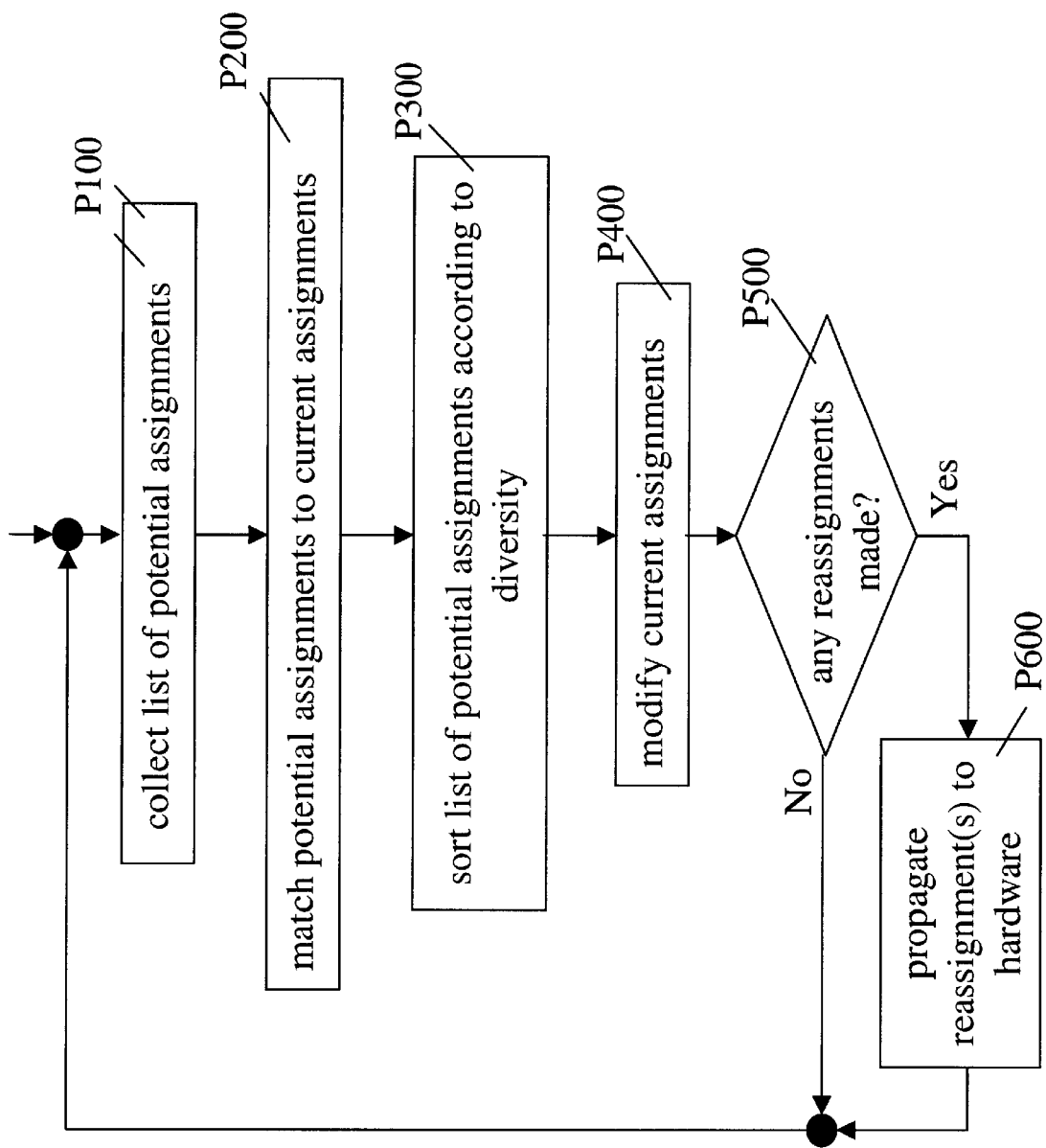
FIG. 10 is a flowchart of a method according to an embodiment of the invention.

Reassignments may be communicated to the tracking elements as they occur; alternatively, reassignments for each cycle may be stored and forwarded at the end of the cycle. FIG. 10 shows a flowchart of a method for assigning tracking elements according to another embodiment of the invention. If test task P500 determines that reassignment of tracking elements occurred in task P400, task P600 propagates the reassignments to the tracking elements. Following the performance of task P500 or P600, the method repeats.

Figure 11:
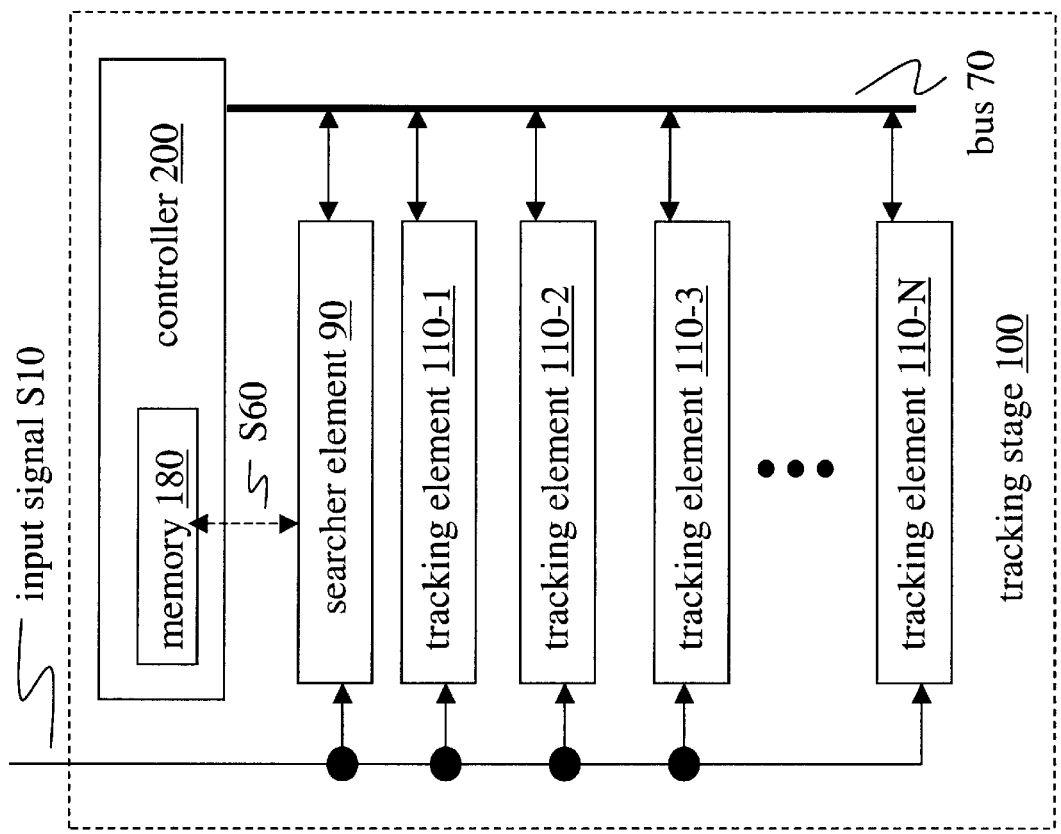
FIG. 11 is a block diagram of a tracking stage 100 according to an embodiment of the invention.

FIG. 11 is a block diagram of a tracking stage 100 according to an embodiment of the invention. The N independent tracking elements 110 are controlled over bus 70 by controller 200, which may include a processor or other array of logic elements (e.g. an application-specific integrated circuit or ASIC) configured to perform tasks of a method as shown, for example, in FIGS. 1, 9, or 10. In a particular implementation, N may be three, four, or eight, although the scope of the invention includes any value of N greater than one. After digitization and possibly other operations (which may include analog and/or digital signal processing operations), a signal received by a receiver stage (not shown) is supplied to searcher element 90 and tracking elements 110-1-110-N as input signal S10. In another implementation, input signal S10 may be a string of retrieved samples that were received and stored earlier. In a CDMA application of tracking stage 100 (e.g. as part of a mobile station), input signal S10 may contain pilot signals from many base stations and may also contain a variety of information signals intended for other mobile stations.

Searcher element 90 obtains information about the signal strengths and time offsets of signal instances it locates within input signal S10. For example, searcher element 90 may continually (or periodically) scan the time domain searching for instances of pilot signals from nearby base stations (e.g. according to an Active, Candidate, and/or Neighbor Set as described above). Searcher element 90 may also scan a set of time offsets (e.g. a time window) around the nominal arrival of a signal instance from each base station in search of multipath signal instances that may have developed.

Searcher element 90 passes the developed data to controller 200 over bus 70. Alternatively, searcher element 90 may pass data directly to controller memory 180 through a direct memory access operation without interrupting the functions of controller 200. Such a direct memory access operation is indicated in FIG. 11 by dashed data line S60 that directly connects searcher element 90 to controller memory 180. In another implementation, memory 180 may reside outside of controller 200, possibly as part of a storage element that may also be accessible to other devices over bus 70 and/or over another interconnection.

Sorting of the data (e.g. a survey path list indicating code offset, time offset, and signal strength) according to energy and diversity may be performed by searcher element 90 (e.g. before storage in memory 180) and/or by controller 200. Controller 200 uses the stored data to match and/or assign each of the tracking elements 110-1-110-N to one of the signal instances that may be contained in input signal S10.

Figure 12:
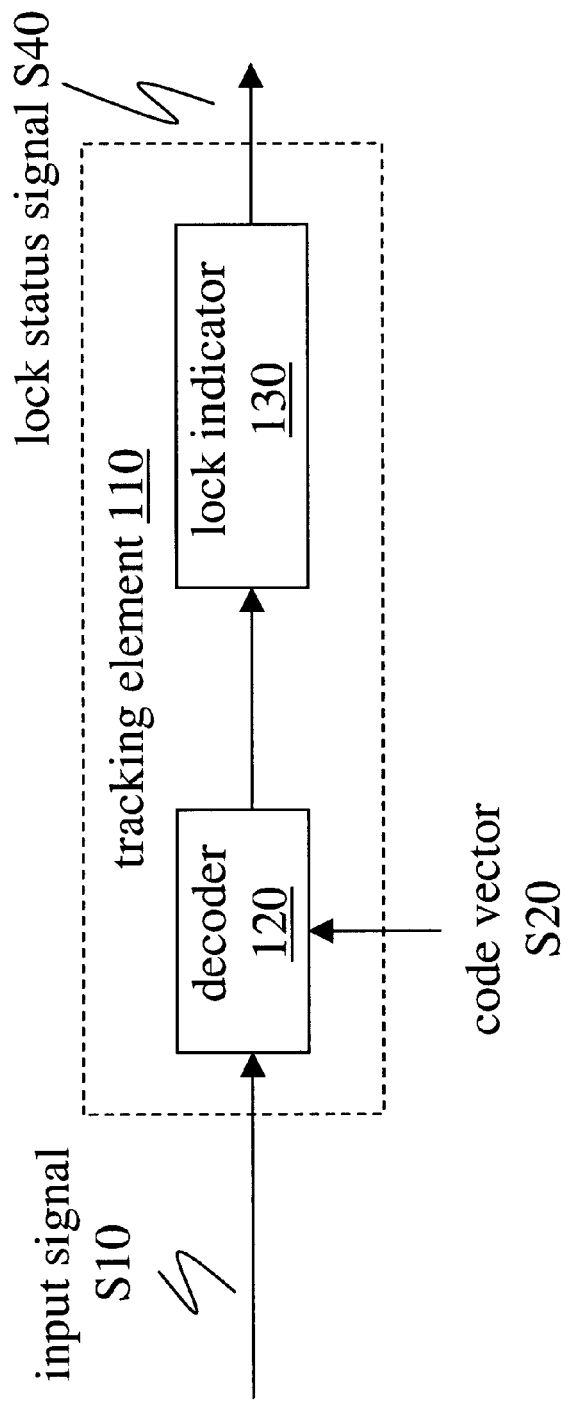
FIG. 12 is a block diagram of a tracking element 110.

FIG. 12 shows a block diagram of a tracking element 110. Decoder 120 receives input signal S10 and a code vector S20 and outputs a decoded signal. In one implementation, input signal S10 is complex-valued, code vector S20 is a complex PN sequence, and decoder 120 performs QPSK despreading. Decoder 120 may be constructed in various different forms to perform such an operation. In an exemplary implementation, code vector S30 is supplied by controller 200 with a PN code and time offset that are appropriate for the assigned path.

In a system compliant with the cdma2000 standard (as described in the TIA documents TIA/EIA/IS-2000-1-6), Walsh codes or quasi-orthogonal functions (QOFs) are used to provide orthogonal channelization, and it may be desirable for decoder 120 to perform removal of channelization codes (also called 'decovering') as well as QPSK despreading. In a particular example, decoder 120 decodes a signal that has been encoded according to the following expression:

$$Y=(X_1+jX_Q)\times(-1)^{(WALSH_{CH}\oplus QOF_{SIGN})}\times j^{WALSH_{ROT}}\times(PN_I+jPN_Q)$$

where Y indicates the assigned signal instance within input signal S10, j indicates the square root of −1, $(X_I+jX_Q)$ indicates the data vector, $(PN_I+jPN_Q)$ indicates the PN code vector, $WALSH_{CH}$ indicates the Walsh channelization code, $QOF_{SIGN}$ indicates a real mask vector that is applied to the Walsh code, and $WALSH_{ROT}$ indicates a Walsh code used to enable or disable rotation by 90 degrees. Again, controller 200 may provide an appropriate code vector S20, and decoder 120 may be constructed in various different forms to perform such an operation.

Figure 13:
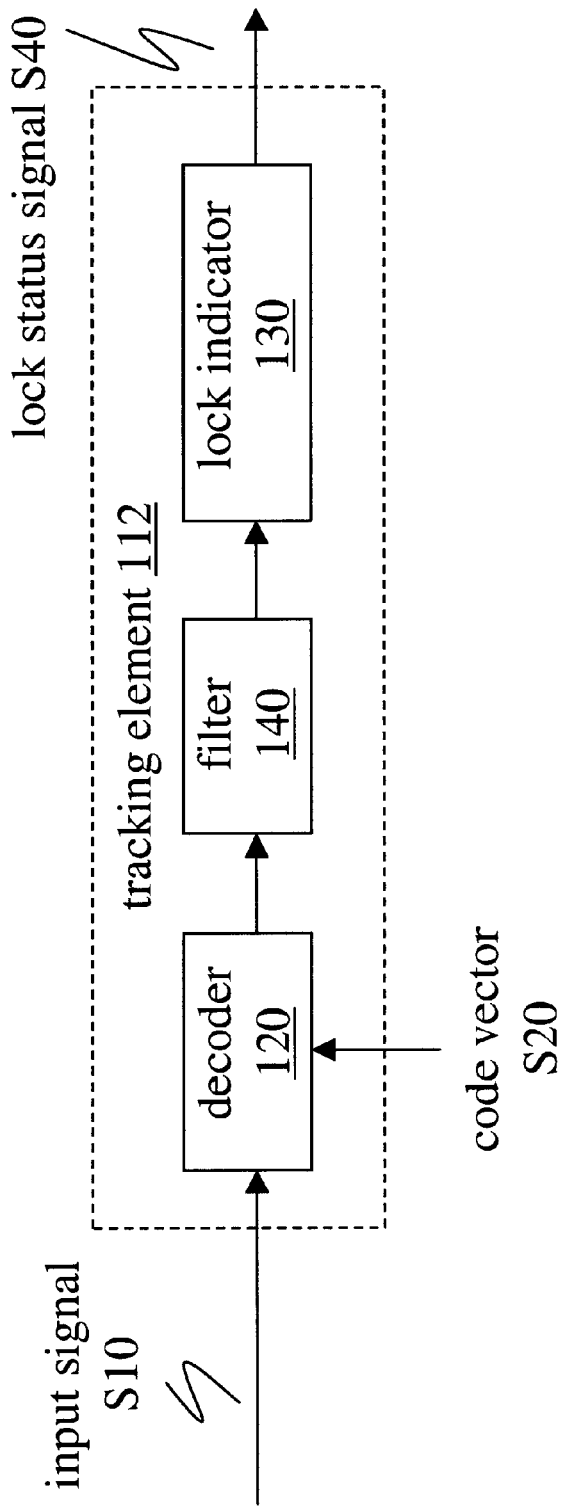
FIG. 13 is a block diagram of a tracking element 112.

Lock indicator 130 receives the decoded signal and outputs a lock status signal S40. In an exemplary implementation, lock indicator 130 receives a complex-valued decoded signal and compares a magnitude of this signal with one or more predetermined energy thresholds. In a further implementation, lock indicator 130 may also output a received signal strength indicator (RSSI) (not shown) based on the signal magnitude. FIG. 13 shows a block diagram of an implementation 112 of tracking element 110 including a filter 140 that receives the decoded signal. In an exemplary implementation, filter 140 is a low-pass filter such as a pilot signal filter. Such a filter may be implemented as a first-order infinite-impulse response filter.

Figures 14A, 14B:
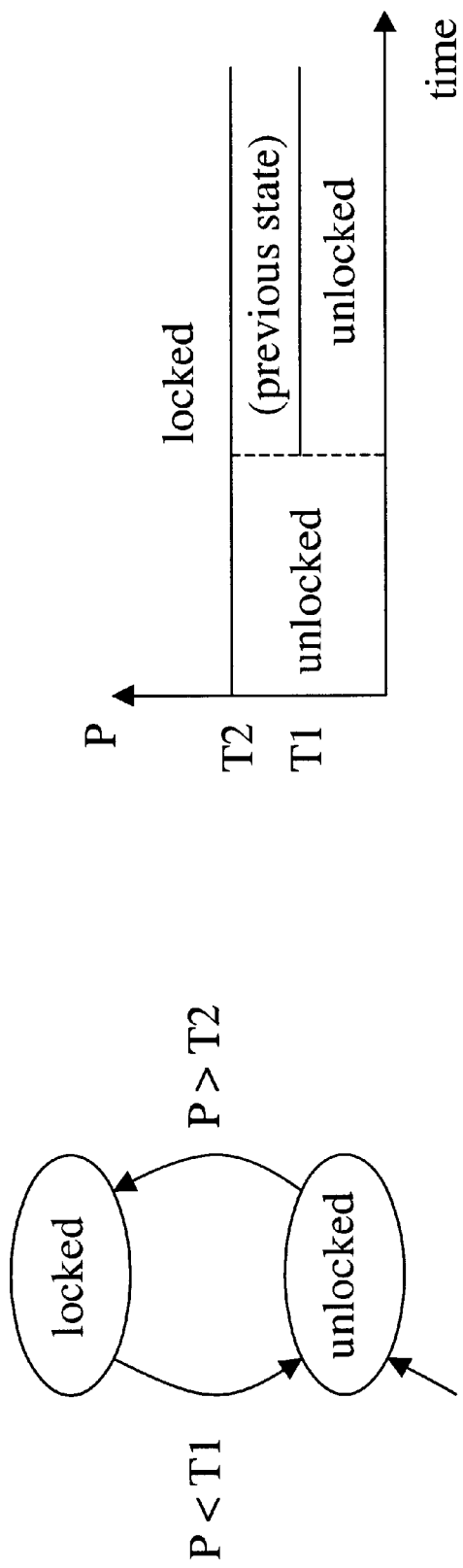
FIG. 14A is a state diagram of a scheme for setting the lock status of a tracking element.
FIG. 14B is a representation of the scheme shown in FIG. 14A as a plot of signal strength versus time.

Lock status signal S40 may establish the lock status of tracking element 110, or controller 200 may establish this status based on the lock status signal and/or RSSI. FIG. 14A shows a diagram of one scheme for setting the lock states of a tracking element 110. Initially, the tracking element is in an unlocked state and may be labeled as available for reassignment. When the signal strength (e.g. as indicated by the RSSI) exceeds a high threshold T2, the tracking element becomes locked to its current assignment. The tracking element remains locked until the signal strength drops below a low threshold T1. FIG. 14B shows a representation of this scheme as a plot of signal strength (P) versus time.

Figure 15:
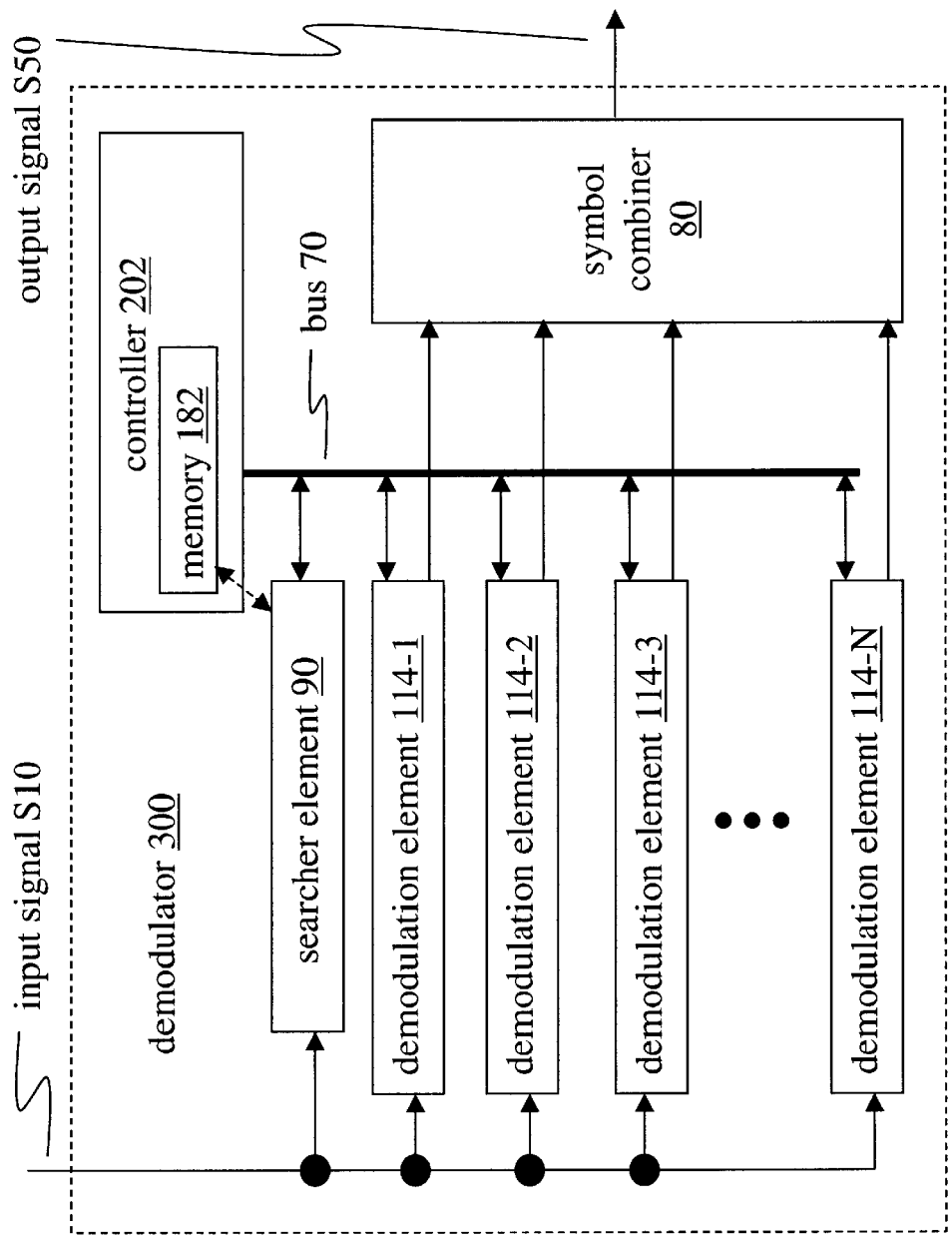
FIG. 15 is a block diagram of a demodulator 300 according to an embodiment of the invention.

FIG. 15 shows a block diagram of a demodulator 300 according to an embodiment of the invention. Demodulation elements 114-1-114-N process input signal S10 to produce soft decision data bits that are combined in symbol combiner 80. In an exemplary application of demodulator 300 to a mobile station of a CDMA system, the output (not shown) of symbol combiner 80 is aggregate soft decision data suitable for Viterbi decoding. As shown in FIG. 15, one or more of demodulation elements 114 may also provide several output control signals to controller 200 (e.g. over bus 70) that may be used during finger assignment. Each of the demodulation elements 114 may be highly similar or even identical in structure to the others. Alternatively, the demodulation elements 114 may include two or more sets having different structures and/or characteristics (e.g. different demodulation and/or decovering operation, different coherent and/or noncoherent search characteristics, etc.). Controller 200, symbol combiner 80, and/or one or more of demodulation elements 114 may include sets of instructions executing on the same processor or set of processors or other arrays of logic elements.

Figure 16:
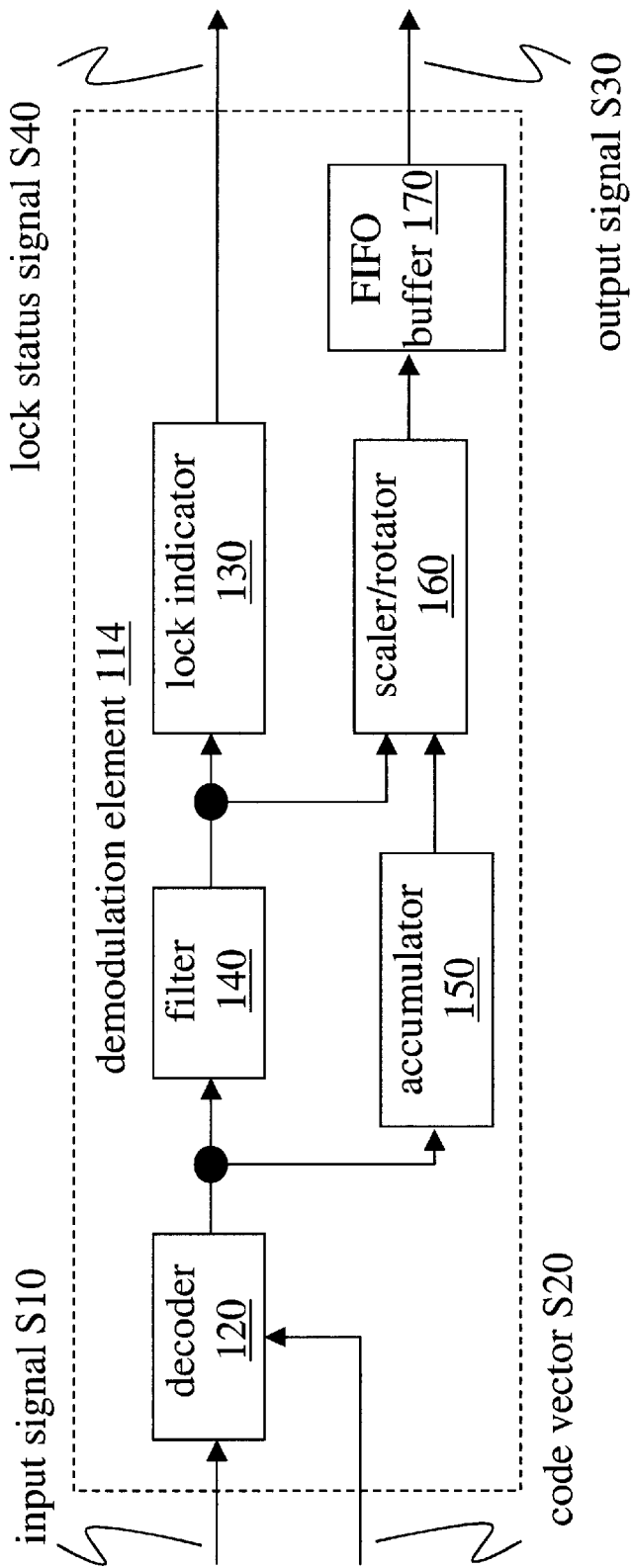
FIG. 16 is a block diagram of a demodulation element 114.

FIG. 16 is a block diagram of a demodulation element 114 suitable for use in a demodulator as shown in FIG. 15. Accumulator 150 accumulates the received data over a symbol period. Scaler/rotator 160 receives phase, magnitude, and symbol information from filter 140 and accumulator 150 and produces scaled and rotated symbols to FIFO buffer 170, which may perform a deskewing function before outputting output signal S30.

In another implementation, one or more of demodulation elements 114 may be constructed according to the demodulation element 204 shown in FIG. 2 of U.S. Pat. No. 5,490,165 (referenced above) and described in that patent document.

A lock status of a demodulation element 114 may be established according to the hysteretic scheme of FIG. 14A. In this scheme, when demodulation element 114 is locked to its current assignment, it writes demodulated symbols to symbol combiner 80, and when it is unlocked, it does not write symbols to symbol combiner 80.

Figures 17A, 17B:
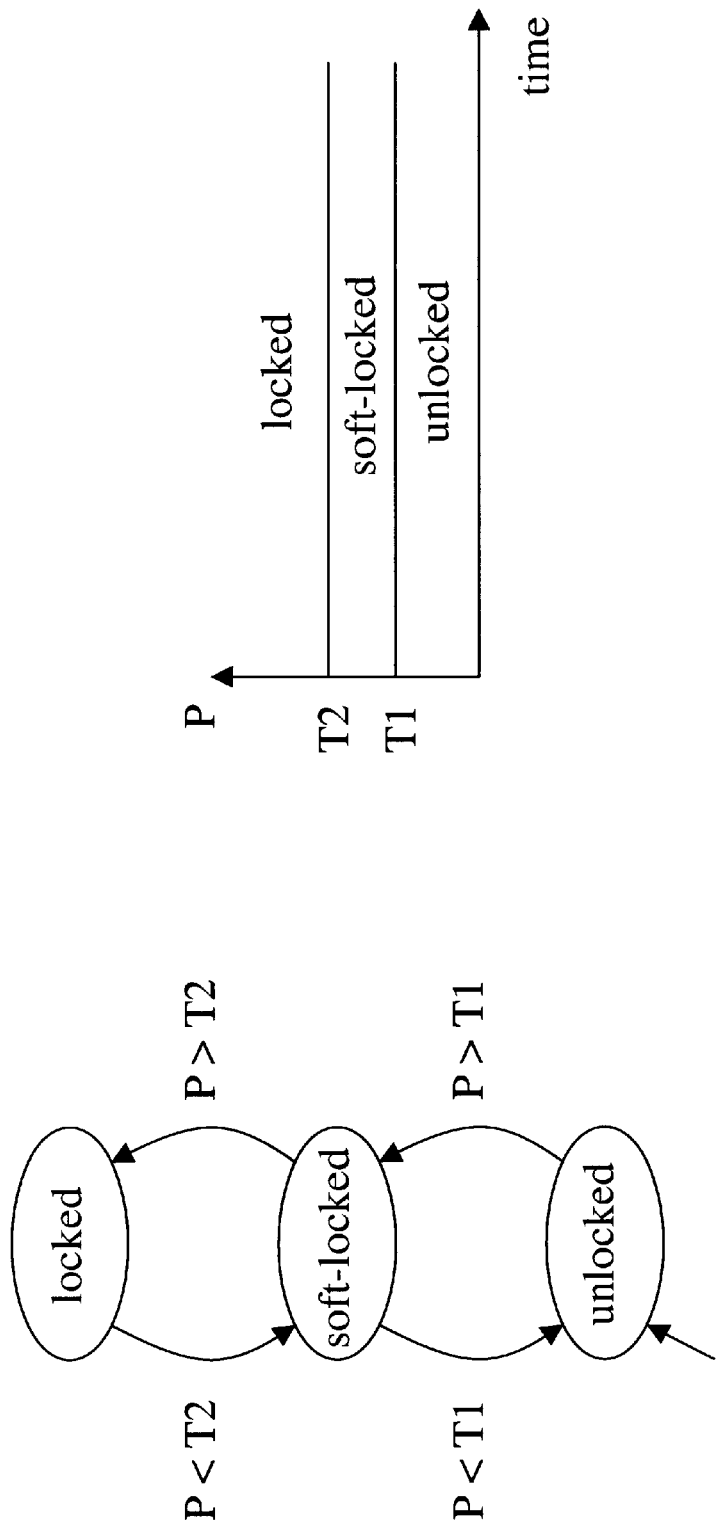
FIG. 17A is a state diagram of a scheme for setting the lock status of a demodulation element.
FIG. 17B is a representation of the scheme shown in FIG. 17A as a plot of signal strength versus time.

In a demodulator according to a further embodiment of the invention, the status of whether a demodulation element is locked to its current assignment is decoupled from the status of whether the demodulation element writes demodulated symbols to symbol combiner 80. FIG. 17A shows a diagram of one such scheme for setting the lock states of a demodulation element 114. Initially, the tracking element is in an unlocked state. When the signal strength exceeds a low threshold T1, the demodulation element enters a soft-locked state. A demodulation element in the soft-locked state writes demodulated symbols to symbol combiner 80 but may also be labeled (e.g. by controller 200) as available for assignment. When the signal strength exceeds a high threshold T2, the demodulation element is locked to its current assignment. FIG. 17B shows a representation of this scheme as a plot of signal strength (P) versus time.

In one combination of a scheme as shown in FIG. 17A with a method as shown in FIGS. 1, 9, or 10, among the soft-locked demodulation elements, only the element tracking the weakest path is labeled available for assignment. In other implementations, several or all of the soft-locked demodulation elements may be labeled available for assignment.

Figures 18A, 18B:
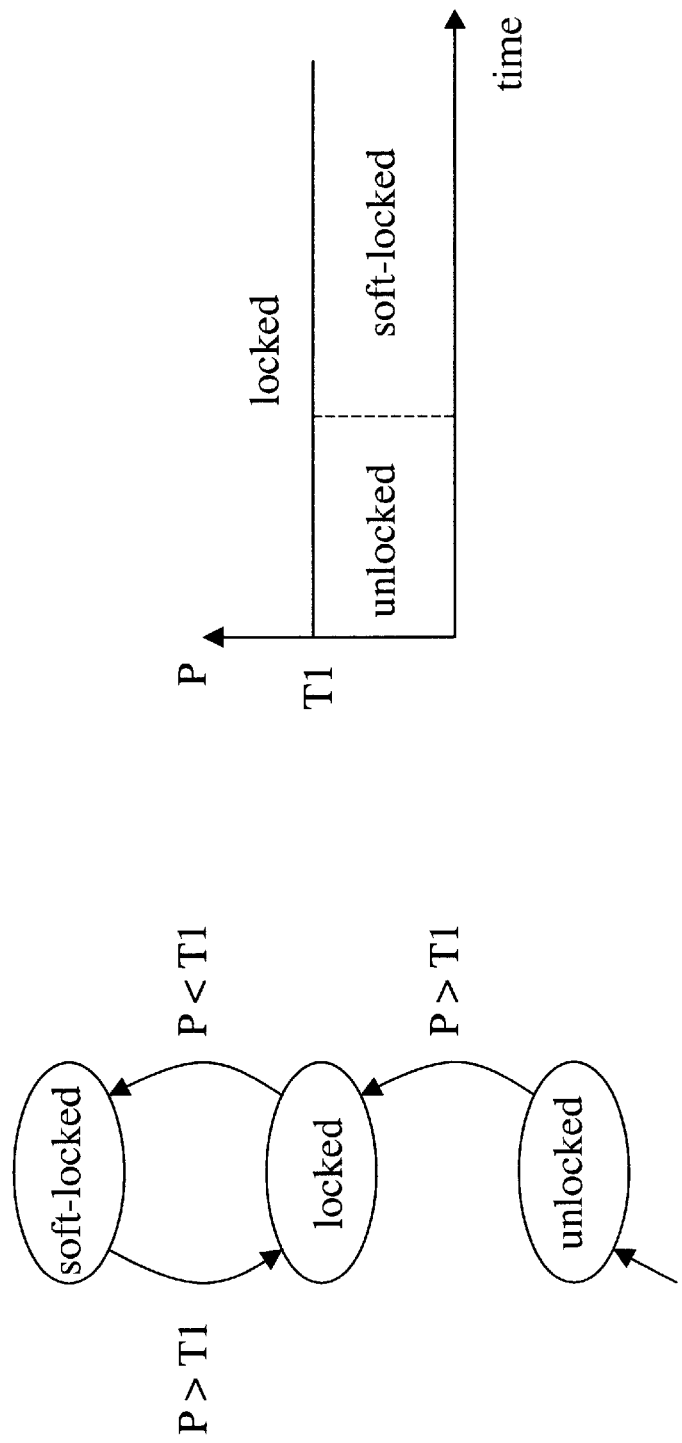
FIG. 18A is a state diagram of a scheme for setting the lock status of a demodulation element.
FIG. 18B is a representation of the scheme shown in FIG. 18A as a plot of signal strength versus time.

FIG. 18A shows a diagram of an alternate scheme for setting the lock states of a demodulation element 114. Initially, the tracking element is in an unlocked state. When the signal strength drops below a threshold T1, the demodulation element becomes locked to its current assignment. Thereafter, the demodulation element changes from a locked to a soft-locked state according to whether the signal strength exceeds the threshold T1. FIG. 18B shows a representation of this scheme as a plot of signal strength (P) versus time.

In a scheme as shown in FIG. 18A, no locked elements lose their locked status. This feature might be expected to slow performance in a case where the number of reassignments is limited, as the pool of available demodulation elements would only grow smaller. As mentioned above, however, one or more of the soft-locked demodulation elements may be labeled as available for assignment, thus adding to the pool of available elements.

Figures 19A, 19B:
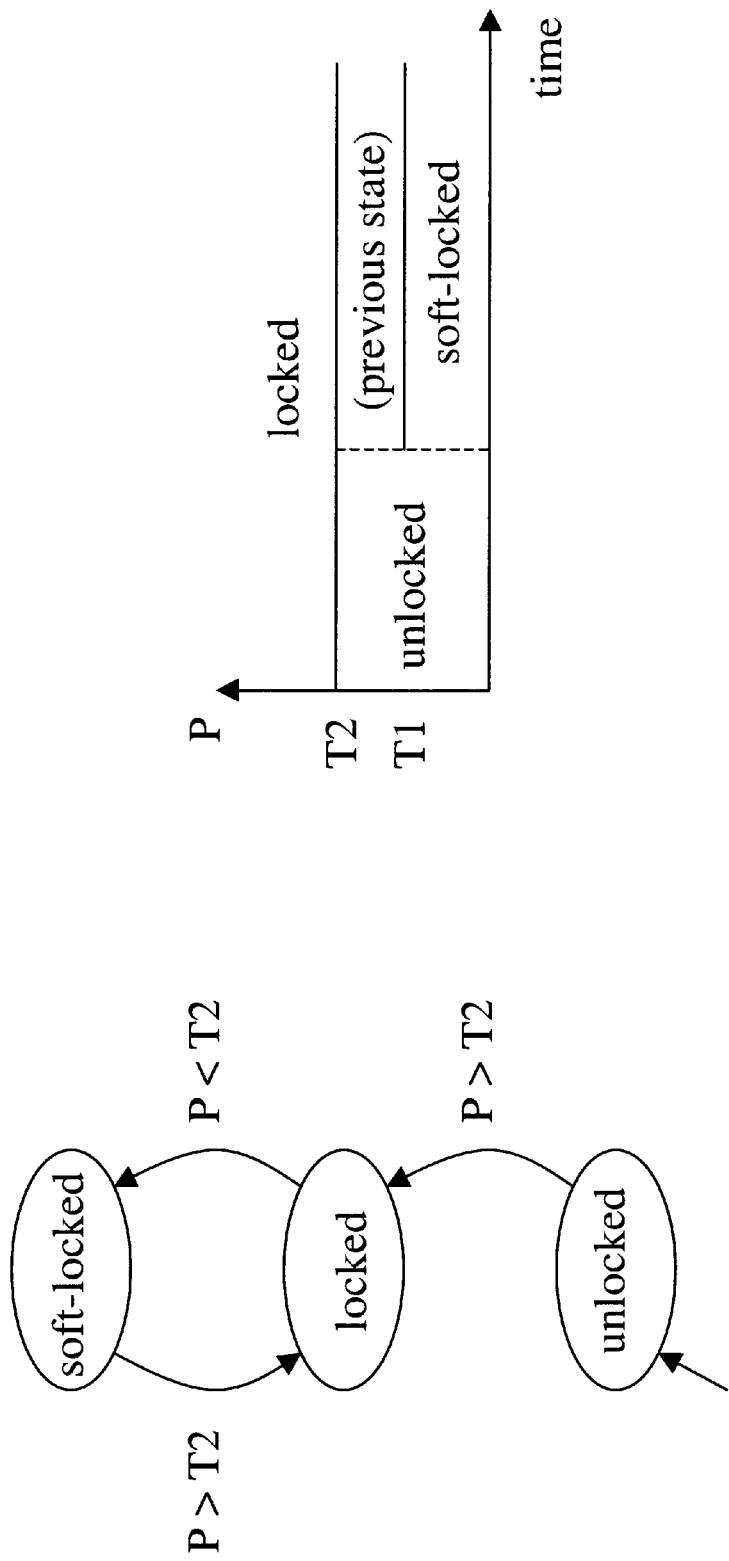
FIG. 19A is a state diagram of a scheme for setting the lock status of a demodulation element.
FIG. 19B is a representation of the scheme shown in FIG. 19A as a plot of signal strength versus time.

FIG. 19A shows a diagram of an alternate hysteretic scheme for setting the lock states of a demodulation element 114. Initially, the tracking element is in an unlocked state. When the signal strength exceeds a high threshold T2, the demodulation element becomes locked to its current assignment. After entering the locked state, the demodulation element changes to a soft-locked state when the signal strength drops below a low threshold T1. FIG. 19B shows a representation of this scheme as a plot of signal strength (P) versus time.

Figures 20A, 20B:
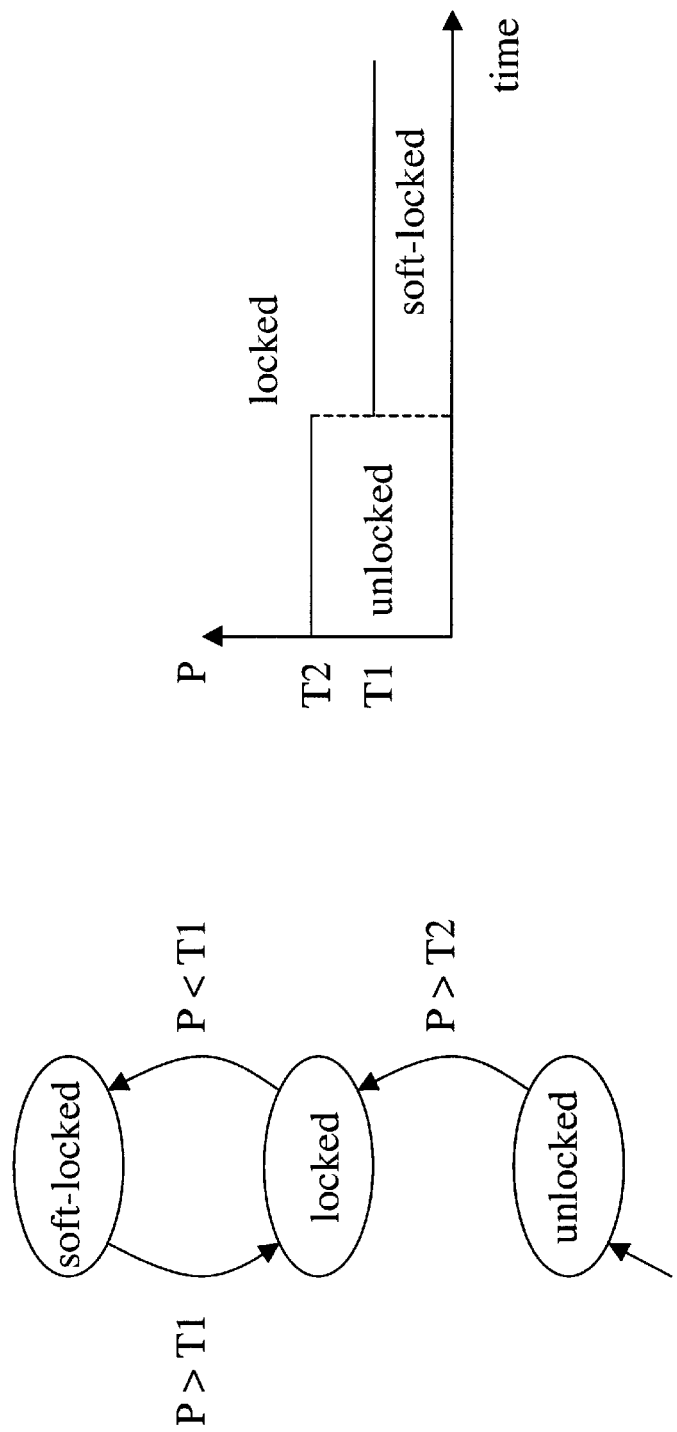
FIG. 20A is a state diagram of a scheme for setting the lock status of a demodulation element.
FIG. 20B is a representation of the scheme shown in FIG. 20A as a plot of signal strength versus time.

FIG. 20A shows a diagram of an alternate scheme for setting the lock states of a demodulation element 114. Initially, the tracking element is in an unlocked state. When the signal strength exceeds a high threshold T2, the demodulation element becomes locked to its current assignment. Thereafter, the demodulation element changes from a locked to a soft-locked state according to whether the signal strength exceeds a low threshold T1. FIG. 20B shows a representation of this scheme as a plot of signal strength (P) versus time. Exemplary values for T1 in the schemes of FIGS. 14A and 17A–20A include −24.6, −26, −28, and −30 dB.

Figures 21A, 21B:
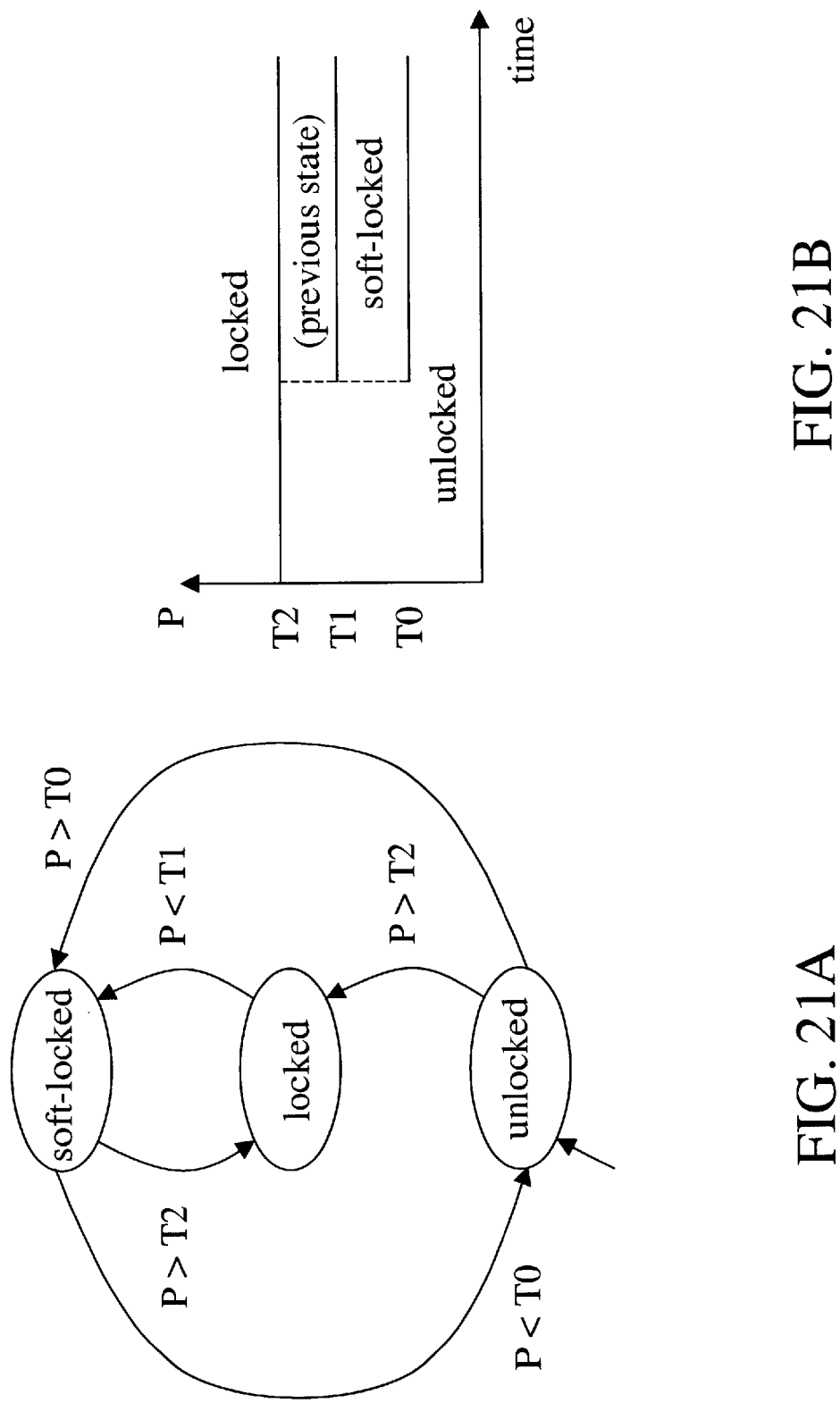
FIG. 21A is a state diagram of a scheme for setting the lock status of a demodulation element.
FIG. 21B is a representation of the scheme shown in FIG. 21A as a plot of signal strength versus time.

FIG. 21A shows a diagram of an alternate hysteretic scheme for setting the lock states of a demodulation element 114. Initially, the tracking element is in an unlocked state. When the signal strength drops below a high threshold T2, the demodulation element becomes locked to its current assignment. After entering the locked state, the demodulation element changes to a soft-locked state when the signal strength drops below a middle threshold T1. When the signal strength is below the middle threshold T1, the demodulation element changes from a soft-locked to an unlocked state according to whether the signal strength exceeds a low threshold T0. FIG. 21B shows a representation of this scheme as a plot of signal strength (P) versus time. In a particular example, the thresholds T1 and T0 have values of −26 dB and −30 dB, respectively. In a further implementation, the transition between the soft-locked and unlocked states may be made hysteretic as well.

The foregoing presentation of the described embodiments is provided to enable any person skilled in the art to make or use a method or apparatus for assigning tracking elements to received signals. Various modifications to the described embodiments are possible, and the principles presented herein may be applied to other embodiments as well. For example, a method according to an embodiment of the invention may be applied to a set of tracking elements that do not themselves perform demodulation of the assigned signals.

The invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. Thus, the present invention is not intended to be limited to the embodiments shown above but rather is to be accorded the widest scope consistent with the principles and novel features disclosed in any fashion herein.

What is claimed is:

1. A method of assigning tracking elements, said method comprising:
   sorting a list of potential assignments according to a diversity criterion, wherein said sorting the list of potential assignments according to a diversity criterion includes sorting the list so that, for a predetermined integer n, each of n consecutive potential assignments on the list corresponds to a different source; and
   changing a current assignment of a selected one of a plurality of tracking elements to one of the potential assignments.

2. The method of assigning tracking elements according to claim 1, further comprising sorting the list of potential assignments according to a measure of energy.

3. The method of assigning tracking elements according to claim 2, wherein sorting the list according to a measure of energy occurs prior to sorting the list according to said diversity criterion.

4. The method of assigning tracking elements according to claim 1, wherein the list of potential assignments comprises a list of received signal instances, each entry of the list including a signal strength and a time offset of the corresponding received signal instance.

5. A method of assigning tracking elements, said method comprising:
   sorting a list of potential assignments according to a diversity criterion, wherein said sorting the list of potential assignments according to a diversity criterion includes sorting the list so that, for a predetermined integer n, each of the first n potential assignments on the list corresponds to a different source; and
   changing a current assignment of a selected one of a plurality of tracking elements to one of the potential assignments.

6. A method of assigning tracking elements, said method comprising:
   collecting a list of potential assignments;
   sorting the list of potential assignments according to a diversity criterion; and
   modifying a current assignment of at least one of a set of tracking elements according to the sorted list of potential assignments;
   sorting the list of potential assignments according to a measure of energy,
   wherein, subsequent to said sorting according to a diversity criterion and said sorting according to a measure of energy, an order of at least a portion of the sorted list of potential assignments is biased according to the diversity criterion.

7. The method of assigning tracking elements according to claim 6, further comprising labeling at least one tracking element as available for assignment.

8. The method of assigning tracking elements according to claim 6, further comprising matching at least a subset of the list of potential assignments to current assignments of the set of tracking elements.

9. The method of assigning tracking elements according to claim 8, wherein said matching includes determining that a strength of a current assignment of a tracking element does not exceed a predetermined threshold and labeling the tracking element as available for assignment.

10. The method of assigning tracking elements according to claim 8, wherein a tracking element outputs demodulated symbols when in a locked state, and
wherein said matching includes labeling at least one tracking element as available for assignment when in the locked state.

11. The method of assigning tracking elements according to claim 8, further comprising determining whether a tracking element is in a locked state, and
wherein said matching includes labeling at least one tracking element as available for assignment when in the locked state.

12. The method of assigning tracking elements according to claim 11, wherein said determining whether a tracking element is in a locked state is based on a signal strength of a current assignment of the tracking element.

13. The method of assigning tracking elements according to claim 6, wherein the list of potential assignments comprises a list of received signal instances, each entry of the list including a signal strength and a time offset of the corresponding received signal instance.

14. The method of assigning tracking elements according to claim 6, wherein said modifying a current assignment includes determining whether the current assignments satisfy a diversity threshold.

15. A method of assigning tracking elements, said method comprising:
collecting a list of potential assignments;
sorting the list of potential assignments according to a diversity criterion, wherein said sorting the list of potential assignments according to a diversity criterion includes sorting the list so that, for a predetermined integer n, each of n consecutive potential assignments on the list corresponds to a different source; and
modifying a current assignment of at least one of a set of tracking elements according to the sorted list of potential assignments.

16. A method of assigning tracking elements, said method comprising:
collecting a list of potential assignments;
sorting the list of potential assignments according to a diversity criterion, wherein said sorting the list of potential assignments according to a diversity criterion includes sorting the list so that, for a predetermined integer n, each of the first n potential assignments on the list corresponds to a different source; and
modifying a current assignment of at least one of a set of tracking elements according to the sorted list of potential assignments.

17. A method of assigning tracking elements, said method comprising:
collecting a list of potential assignments;
sorting the list of potential assignments according to a diversity criterion; and
modifying a current assignment of at least one of a set of tracking elements according to the sorted list of potential assignments, wherein said modifying a current assignment includes changing a current assignment of a tracking element from a covered cell to a previously uncovered cell.

18. A tracking stage of a mobile station, said tracking stage comprising:
a searcher element configured and arranged to receive an input signal and to collect a list of potential assignments corresponding to signal instances within the input signal;
a plurality of tracking elements configured and arranged to receive the input signal; and
a controller configured and ranged to sort the list of potential assignments according to a diversity criterion,
wherein at least some of the tracking elements have a current assignment corresponding to a signal instance within the input signal, and
wherein the controller is further configured and arranged to modify at least one of the current assignments according to the sorted list of potential assignments and to modify at least one of the current assignments by changing a current assignment of a tracking element from a covered cell to a previously uncovered cell.

19. The tracking stage according to claim 18, wherein each of the tracking elements is further configured and arranged to output demodulated symbols of an assigned signal instance when in a locked state, and
wherein the controller is further configured and arranged to label at least one tracking element as available for assignment when in the locked state.

20. The tracking stage according to claim 18, wherein said controller is further configured and arranged to match at least a subset of the list of potential assignments to current assignments of the tracking elements.

21. The tracking stage according to claim 18, wherein said controller is further configured and arranged to determine whether the current assignments satisfy a diversity threshold.

22. A tracking stage of a mobile station, said tracking stage comprising:
a searcher element configured and arranged to receive an input signal and to collect a list of potential assignments corresponding to signal instances within the input signal;
a plurality of tracking elements configured and arranged to receive the input signal; and
a controller configured and arranged to sort the list of potential assignments according to a diversity criterion,
wherein at least some of the tracking elements have a current assignment corresponding to a signal instance within the input signal, and
wherein the controller is timber configured and arranged to modify at least one of the current assignments according to the sorted list of potential assignments and arranged to sort the list of potential assignments according to a diversity criterion so that, for a predetermined integer n, each of the first n potential assignments on the sorted list corresponds to a different source.

23. A data storage medium having machine-readable code, the machine-readable code including instructions executable by an array of logic elements, said instructions defining a method of assigning tracking elements, said method comprising:

collecting a list of potential assignments;

sorting the list of potential assignments according to a diversity criterion, wherein said sorting the list of potential assignments according to a diversity criterion includes sorting the list so that, for a predetermined integer n, each of the first n potential assignments on the list corresponds to a different source; and modifying a current assignment of at least one of a set of tracking elements according to the sorted list of potential assignments.

24. The data storage medium according to claim 23, further comprising matching at least a subset of the list of potential assignments to current assignments of the set of tracking elements, wherein a tracking element outputs demodulated symbols when in a locked state, and wherein said matching includes labeling at least one tracking element as available for assignment when in the locked state.

25. The data storage medium according to claim 24, further comprising determining whether a tracking element is in a locked state is based on a signal strength of a current assignment of the tracking element.

* * * * *